US009795958B2

(12) United States Patent
Reichmuth et al.

(10) Patent No.: US 9,795,958 B2
(45) Date of Patent: Oct. 24, 2017

(54) PIPETTING APPARATUS, PIPETTING CONTAINER AND METHOD FOR THE PRODUCTION THEREOF

(71) Applicant: Eppendorf AG, Hamburg (DE)

(72) Inventors: Burkhardt Reichmuth, Hamburg (DE); Michael Schicke, Kaltenkirechen (DE); Wilko Hein, Berlin (DE); Volker Plickert, Brieselang (DE)

(73) Assignee: EPPENDORF AG, Hamburg (DE)

( * ) Notice: Subject to any disclaimer, the term of this patent is extended or adjusted under 35 U.S.C. 154(b) by 862 days.

(21) Appl. No.: 13/966,157

(22) Filed: Aug. 13, 2013

(65) Prior Publication Data

US 2014/0051182 A1 Feb. 20, 2014

Related U.S. Application Data

(60) Provisional application No. 61/682,333, filed on Aug. 13, 2012.

(30) Foreign Application Priority Data

Aug. 13, 2012 (DE) ........................ 10 2012 016 020

(51) Int. Cl.
*B01J 19/00* (2006.01)
*B01J 3/02* (2006.01)
*B01L 3/02* (2006.01)

(52) U.S. Cl.
CPC ............. *B01L 3/021* (2013.01); *B01L 3/0237* (2013.01); *B01L 3/0217* (2013.01); *B01L 3/0234* (2013.01);
(Continued)

(58) Field of Classification Search
CPC .. Y10T 436/25; Y10T 436/2575; B01L 3/021; B01L 3/02; B01L 3/0217
(Continued)

(56) References Cited

U.S. PATENT DOCUMENTS 5,620,661 A 4/1997 Sch urbrock
5,747,350 A 5/1998 Sattler
(Continued)

FOREIGN PATENT DOCUMENTS

DE 10001938 A1 8/2001
DE 29522141 U1 9/2001
(Continued)

*Primary Examiner* — Christine T Mui
(74) *Attorney, Agent, or Firm* — Todd A. Lorenz

(57) ABSTRACT

The invention relates to a pipetting apparatus for pipetting laboratory samples into a pipetting container which can be connected to the pipetting apparatus, which pipetting container is in particular designed according to the invention, comprising a container side and a first connection section, by means of which the pipetting container can be connected to the pipetting apparatus, and comprising an information carrying device with at least one information section, which carries information, on this container side; the pipetting apparatus comprising an electric information reading device, by means of which information contained on the information reading device can be read when the pipetting container is connected to the pipetting apparatus, and which comprises at least one electric sensor device, which comprises at least one sensor section, opposite to which a measuring space is formed, wherein the sensor device is configured to read the information content of at least one information section when the latter is arranged in the measuring space. The invention furthermore relates to the pipetting container or adapter element, which can be used with the pipetting apparatus, and a method for the production thereof.

12 Claims, 12 Drawing Sheets

Figure 1:
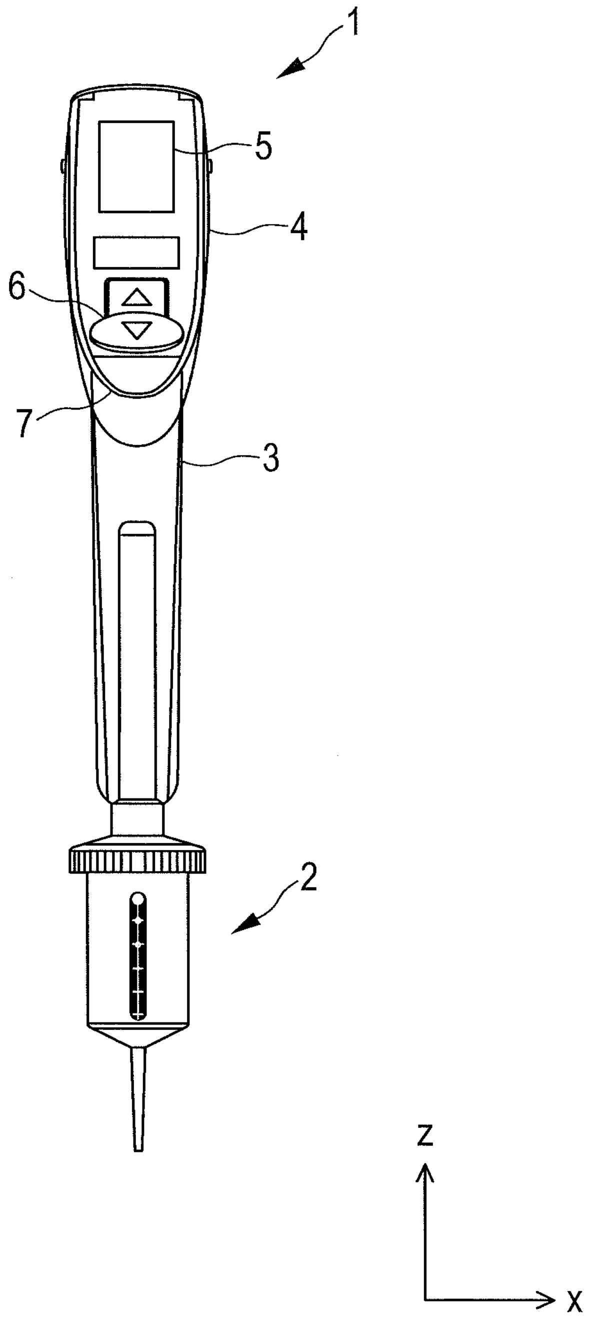

(52) U.S. Cl.
CPC ... *B01L 2200/023* (2013.01); *B01L 2200/143* (2013.01); *B01L 2300/021* (2013.01); *Y10T 436/2575* (2015.01)

(58) Field of Classification Search
USPC .................... 436/180, 174; 422/501, 500, 50
See application file for complete search history.

(56) References Cited

U.S. PATENT DOCUMENTS

| | | | | |
|---|---|---|---|---|
| 5,844,686 | A | 12/1998 | Treptow et al. | |
| 2001/0019701 | A1 | 9/2001 | Braun et al. | |
| 2003/0156994 | A1* | 8/2003 | Mahler et al. ........ | B01L 3/0279 422/525 |
| 2007/0203457 | A1 | 8/2007 | Kohn et al. | |
| 2010/0266454 | A1* | 10/2010 | Reichmuth ........... | B01L 3/0279 422/501 |

FOREIGN PATENT DOCUMENTS

| | | | |
|---|---|---|---|
| EP | 0576967 | A2 | 1/1994 |
| WO | WO 2004/052543 | A1 | 6/2004 |

* cited by examiner

PIPETTING APPARATUS, PIPETTING CONTAINER AND METHOD FOR THE PRODUCTION THEREOF

The invention relates to a pipetting apparatus and to a pipetting container for the connection to the pipetting apparatus, and to a method for producing the pipetting container.

Such pipetting apparatuses are used predominantly in laboratories for transporting and transmitting fluid samples, in particular for metering the samples. In pipetting apparatuses, e.g. liquid samples are suctioned into pipette tips by means of negative pressure, stored therein and ejected again at the target location.

Pipetting apparatuses include e.g. manually operated pipettes and dispensers. A pipette is understood to mean an instrument, in which the sample amount dispensed by the instrument by a single actuation substantially corresponds to the amount of sample suctioned into the instrument. By contrast, in a dispenser, an amount of taken-up sample corresponding to several dispensing amounts is re-dispensed in steps. Moreover, a distinction is made between single-channel instruments and multichannel instruments, wherein single-channel instruments only contain a single dispensing channel and multichannel instruments contain several dispensing channels, which, in particular, enable parallel dispensing/taking up of the sample.

Examples of manually operated pipettes are the EPPENDORF REFERENCE® and the EPPENDORF RESEARCH® by Eppendorf AG, Hamburg, Germany; an example of a manually operated dispenser is the MULTIPETTE PLUS® by Eppendorf AG; an example of an electronic pipette is the EEPPENDORF XPLORER® by Eppendorf AG; examples of electronic dispensers are the MULTIPETTE STREAM® and XSTREAM® by Eppendorf AG.

DE 43 42 178 C2 describes a known pipetting apparatus, namely a repeater pipette, which is a dispenser. Unlike in the case of a pipette, which operates according to the air cushion principle, the displacement plunger in this dispenser is not arranged in the instrument shaft, but rather it is part of the pipetting container, in which the laboratory sample is held and which is designed in the style of a syringe. The dispenser operates according to the direct displacement principle. Here, the displacement plunger of the syringe is substantially not separated from the sample liquid by an air cushion during the metering of a sample liquid, but rather it is in direct contact with the latter, as a result of which particularly accurate metering is possible. The displacement plunger belonging to the syringe is coupled to a movement device arranged in the instrument shaft of the dispenser. The additional advantage of the syringe according to the aforementioned document is, in particular, that the pipetting container comprises an information carrier. A mechanically-electrically operating sensor arrangement, which is arranged on the connection section of the dispenser and has several mechanical micro-switches, serves to read out information. This information is used by an electric control device of the dispenser, which is arranged in the instrument shaft, to determine the type of the syringe connected to the dispenser and, from this, identify the maximum admissible filling volume of the syringe in particular. Using this information, the control device further selects the control program which converts the desired sample volumes predetermined by the user into corresponding plunger movements.

The sensor of the known sensor device uses a probing device, which reads out seven readout regions on the syringe. The readout regions are arranged concentrically about the plunger axis on the connection side of the syringe and face the head section of the dispenser. Each readout region has (or does not have) a projection, which, when the syringe is connected to the dispenser, presses onto a mechanical probe pin of the probing device of the sensor and thereby activates (or does not activate) said pin and thereby closes (or does not close) an electric circuit. As a result of the relatively large volume of the movable components of the probing device and the usually comparatively small amount of space on a pipetting container compared thereto, the number of possible readout regions, and hence the amount of information which can be encoded and distinguished by the readout regions, is relatively limited. Furthermore, the movable components tend to wear and can only be serviced with much outlay.

Proceeding therefrom, the invention is based on the object of developing an improved pipetting apparatus, which, in particular, enables reliable operation of the pipetting apparatus.

This object is achieved by the pipetting apparatus and the pipetting container for the pipetting apparatus described in the claims. Preferred refinements of the subject matter are also described in the claims.

The pipetting apparatus according to the invention for pipetting laboratory samples into a pipetting container which can be connected to the pipetting apparatus, in particular in a pipetting container according to the invention, which comprises a first connection section on a container side, by means of which connection section the pipetting container can be connected to the pipetting apparatus, and on this container side comprises an information carrying device with at least one information section, which carries information, comprises:

a connection device, by means of which, in a connection position, the pipetting container can be connected to the pipetting apparatus, and an electric information reading device, by means of which the information can be read in the connection position, wherein the information reading device comprises at least one electric sensor device which comprises at least one sensor section and, opposite thereto, at least one measuring space, in which the at least one information section can, in the connection position, at least be partly arranged on the container side, wherein the sensor device is configured to carry out a measurement which is influenced by the at least one information section in the at least one measuring space, by means of which this information can be established.

The pipetting apparatus according to the invention in particular offers the advantage that no mechanical control elements of the pipetting apparatus are required to capture the information content of the information section. Rather, a measuring space of the pipetting apparatus according to the invention is provided so that the measurement can take place without mechanical contact transmission by virtue of the information section being arranged in this measuring space in the connection position of the pipetting container with the pipetting apparatus and being measured there. As a result, a sensor device can have a more compact design. Furthermore, the wear of the pipetting apparatus is reduced and the operation of the pipetting apparatus becomes more reliable. Moreover, the provision of the measuring space offers the advantage that the sensor section responsible for the measurement is easily visible and treatable for cleaning or servicing purposes by means of this measuring space. This also makes the operation of the pipetting apparatus more reliable.

According to the invention, a pipetting apparatus is understood to mean an apparatus by means of which a fluid can be transferred into a pipette container for the fluid by suction and can, in particular, be dispensed again from there. In the case of a pipetting apparatus, a fluid is suctioned into the container by means of negative pressure. The negative pressure is generally generated by a plunger, which can move in a cylinder, of a movement device. In particular, the plunger is moved manually or by machine, in particular by an electric drive. The negative pressure can be generated by means of an expandable volume of air between the fluid and the fluid-side end of the plunger. As an alternative thereto, the fluid-side end of the plunger is brought into direct contact with the fluid, or at least brought into the direct vicinity of the fluid, in the case of the direct displacement principle.

The pipetting apparatus is preferably a pipette or a dispenser. The pipetting apparatus can furthermore be manually operated or electrically operated and, to this end, in particular, comprise a manually operated or electrically operated movement device. The pipetting apparatus can be a single-channel instrument or a multichannel instrument.

The pipetting apparatus is preferably designed for the transfer, more particularly the metering, of small amounts of fluid. In particular, this is understood to mean fluid volumes in the range between 0.5 μl and 200 ml. These fluids are usually aqueous liquids, but can also be e.g. other inorganic or organic liquids. The metering accuracy, preferably measured according to EN ISO 8655, for the systematic measurement error (SMA) is respectively preferably SMA=+/−(0.02-0.08) μl given an aqueous fluid volume V=1 μl, SMA=+/−(0.08-0.16) given V=10 μl, SMA=+/−(0.6-1.0) μl given V=100 μl. The relative systematic measurement error (SMA/V) is preferably between 5-50 per mille. The systematic measurement error is the deviation of the metered volume from the nominal volume or from the chosen volume of the pipetting apparatus. It can be determined by averaging from ten measurements.

The pipetting apparatus is preferably a handheld apparatus. To this end, it preferably has a handle section. The main body is preferably configured as a handle section, which is gripped by the hand of the user in order to hold the pipetting apparatus, and in particular in order to move and operate the latter. The pipetting apparatus is preferably designed for one-handed operation such that all processes required for pipetting can be carried out by one hand. However, the pipetting apparatus can also be a component of laboratory apparatus, e.g. a laboratory machine.

The main body preferably has a housing, in which the movement device can be arranged at least partially or else completely. The control device is preferably arranged at least partially or else completely in the main body.

The movement device serves to move the fluid for transferring the latter and serves in particular to hold the fluid in the container and to dispense the fluid from the container. In the case of a manually operated movement device, the latter preferably comprises an actuation element, in particular an operating button, by the actuation of which the user applies the force for moving the fluid. In the case of an electrically operated movement device, the force for moving the movement device is applied by means of an electric energy source, which can, in particular, be a battery or a rechargeable battery and which can be a component of the pipetting apparatus, in particular of the main body. The movement device preferably has a plunger device with a plunger, which can move in a cylinder of the plunger device in order to generate negative pressure in this cylinder. However, the movement device can also be configured to move a plunger which is only partially a component of the pipetting apparatus, or not at all, as is the case when e.g. moving the plunger of a syringe container.

The pipetting apparatus preferably comprises at least one user interface, in particular an operating element, which, in particular, serves to input and/or output information between user and the control device. The operating element can comprise at least one operating button or keyboard, at least one display or touchscreen and/or at least one loudspeaker.

The information reading device preferably comprises a number N of sensor devices, where N is preferably N>=1, in particular N>1. It is preferable for 7<=N<=16, since the desired information can be encoded and read out on the instrument side in an efficient manner in this range, particularly if a sensor device can and/or should only capture a restricted number M of distinguishable measurement states, which is likewise preferred for reasons of efficiency. Information can be read out as code, preferably from at least one information section on the pipetting container, in particular from a number N_P>1 of information sections, where here it is preferable for N_P=N. The information reading device can comprise an electric control device, which, in particular, is configured to evaluate the measurement signals from the at least one sensor device. It is preferable for the electric control device, for the purposes of evaluating the measurement signals, to be arranged separate from the information reading device. This saves space in the vicinity of the information reading device and enables a more compact design or a more compact integration of sensor devices in this region.

The sensor device is preferably configured to be able to capture the information content of the information section arranged in the measuring space, without the transmission of mechanical forces from the pipetting container to a section of the sensor device, in particular the sensor section of the sensor device. In the present case, this is also referred to as a "non-mechanical" measurement. In particular, no mechanical force is transmitted from the pipetting container or the information section thereof onto the sensor device in the connection position. The sensor device preferably has no movable parts. The measurement signal to be established by the sensor device can, in particular, be generated and/or captured without the movement of parts. In particular, the measurement signal can be generated in a non-mechanical fashion. Compared to known sensor devices, which comprise a mechanical and therefore relatively wear-prone switch, this offers the advantage of a lower wear and hence a lower servicing outlay for the pipetting apparatus.

The at least one sensor device is preferably configured for non-mechanical measurements. In a first preferred embodiment of the invention, the sensor device is an optical sensor device, which captures an optical property of the information section. In a second preferred embodiment of the invention, the sensor device is a capacitive sensor device, which captures a change in the capacitance value brought about by the information section. Both preferred embodiments will still be explained in more detail below.

A sensor device is preferably designed to generate at least one measurement signal, which is characteristic for a predetermined measurement state. The measurement state is characterized by the unique and distinguishable arrangement of at least one information section relative to at least one measuring space. In the present case, two distinguishable measurement states are understood to mean that two different arrangements of respectively one measuring space and one information section are present in different states, which can be distinguished by the sensor device. The number M>0 of distinguishable measurement states of preferably at least one sensor device or preferably each sensor device is preferably 2<=M<=16, particularly preferably 2<=M<=8, more preferably 3<=M<=8, preferably M={2 or 3}, more preferably M=3. An advantage obtained as a result of it being possible to distinguish a relatively large number of measurement states, in particular more than 2 measurement states, by a sensor device is that the pipetting apparatus can comprise a relatively small number of sensor devices in order to be able to distinguish between the same maximum number Z of distinguishable items of information. Here, the volume required for the arrangement of the information reading device on the pipetting apparatus can be kept small if fewer sensor devices are required. As a result, the design of the pipetting apparatus becomes more compact. In the present case, the number M is also referred to as measurement resolution of the sensor device.

The information preferably represents the type of pipetting container connected to the pipetting apparatus, which type of pipetting container is, in particular, characterized by the predetermined, maximum receiving volume of the pipetting container for the fluid sample. If this information is known, the pipetting apparatus can furthermore automatically control the measures required for reaching this pipetting volume, depending on the measurement result and e.g. depending on a predetermined intended value for a pipetting volume. By way of example, depending on the information and a user-defined intended value, the required plunger stroke in a dispenser syringe can automatically be controlled by the dispenser in order to achieve the desired intended volume.

The measuring space is the clear space at the sensor device, within which clear space the sensor device for reading out information of at least one information section can perform measurements. The measuring space can be defined as the clear space adjoining the sensor section or the sensor area of the sensor section. The measuring space can also be defined as the clear space adjoining the at least one information section of a pipetting container when the latter is arranged in the connection position. The measuring space can also be defined as the clear space which is taken up by the at least one information section in the connection position, more particularly in the measuring position. The measuring space can furthermore be determined by several or all of these definitions.

The sensor device preferably comprises at least one delimiting wall, which delimits the at least one measuring space. This is how the region of the measurement is protected from influences from outside of the measuring space. This delimiting wall preferably extends substantially in the axial direction. The measuring space is preferably shielded by this delimiting wall in at least one radial direction, which is perpendicular to this axis. As a result, no or only few detrimental influences, e.g. foreign bodies, moisture or radiation, can reach the measuring region from the radial direction. Furthermore, this is how the at least one information section can, in the axial direction, be transferred parallel to this delimiting wall into the measuring space when the pipetting container is connected to the pipetting apparatus. This delimiting wall can at the same time be embodied as a guide device for guiding the connection movement or be part of such a guide device.

The pipetting apparatus preferably comprises a guide device for guiding the pipetting container on the pipetting apparatus during the connection movement. The guide device serves in particular to align the pipetting container, in particular the at least one information section, with respect to the pipetting apparatus, more particularly the sensor device, more particularly the sensor section, more particularly the sensor area. The alignment is preferably such that an information section of the pipetting container is arranged perpendicular to the sensor section, more particularly the sensor area, in this connection position.

The delimiting wall is preferably arranged on the substrate on which the at least one sensor device is also arranged. This enables a compact design and direct protection of the sensor device. However, the delimiting wall can also be assigned to another component of the pipetting apparatus. The distance D_W of the delimiting wall from the sensor section, more particularly the sensor area, is preferably selected in such a way that the measurement is neither interfered with by external influences nor unacceptably influenced by the adjacent delimiting wall itself. The minimum distance of the delimiting wall from the sensor section in a radial direction is preferably between 0.0 and 5.0, preferably between 0.0 and 3.0, preferably between 0.0 and 2.0, preferably between 0.0 and 1.0 (specifications in millimeters). The delimiting wall can extend in the axial direction, proceeding from the plane of the sensor area. However, it can also be arranged at a distance above the sensor area. In particular, a delimiting wall can be arranged in such a way that it is arranged between two or more measurement clear spaces, which are respectively associated with one sensor device. This can prevent the measurements in the measurement clear spaces of different sensor devices from influencing one another.

The sensor area of the sensor device is preferably a detector surface, by means of which, in particular, a measurement state or change in the measurement state in the measuring space is captured, more particularly a surface and/or more particularly a substantially planar area, which is preferably sensitive over its whole extent or at least over a fraction f<1 of this extent to changes perpendicularly above this detector surface or perpendicularly at a distance parallel to this detector surface, such that, in particular, the sensor device can carry out measurements perpendicularly above this extent of the sensor area. The specification of the "upward" direction here supposes that the sensor area points in the direction of the positive z-axis of a Cartesian coordinate system, wherein the negative z-axis can denote the direction of gravity at the location of the observer. At least one further sensor element, more particularly an emitter element, e.g. a light source, can be arranged adjoining this sensor area or partly or completely within or perpendicular below the plane of the sensor surface. The sensor area can completely or partly serve for measurements, in particular be wholly or partly impacted or traversed by irradiated or reflected light.

The sensor area preferably has such a planar design that minimum and maximum elevation values of the sensor area perpendicular to said sensor area do not exceed a maximum distance d_max, where d_max is preferably selected from a group of values {1.000 mm; 0.100 mm; 0.050 mm; 0.010 mm; 0.005 mm; 0.0005 mm}. The sensor area preferably has such a planar design that it is substantially edge-free and/or step-free. As a result of this, it is easier to clean dirtying in particular. Furthermore, the measurement can be carried out more accurately or with higher sensitivity.

The pipetting apparatus or the sensor device preferably has a cover device, which partly or preferably wholly covers the sensor area. Said sensor area in particular can be the common sensor area, which correspond to multiple sensor devices. The common sensor area can be part of the embodiment of the pipetting apparatus, wherein the information reading device comprises a number N>1 of sensor devices, the sensor sections of which have a common sensor area adjoining the at least one measuring space, which sensor area has a substantially planar design. The cover device can be a protective plate, protective cap or protective layer. It can be selected depending on the type of sensor device, so as not to interfere with the measurement function of the sensor device or so as even to improve the latter.

Preferably, the cover device is arranged to cover, in particular at least in part or completely, at least one sensor area of at least one sensor device, and/or to cover multiple sensor areas, which correspond to multiple sensor devices, and/or to cover all sensor areas, which correspond to all sensor devices of the information reading device of the pipetting apparatus and/or to cover at least one common sensor area, which correspond to multiple sensor devices.

It is possible and preferable for this cover device to comprise a material or consist of a material, which is metal. The material, in particular the metal, is, in particular, a chemically inert material, preferably hard gold or a gold-nickel alloy. However, the material comprised by the cover device or of which the cover device consists can also be a plastic, preferably a liquid crystal polymer (LCP), preferably parylene, or respectively preferably epoxy resin, polyamide, polycarbonate, polypropylene or polyurethane. The material is preferably transparent, preferably in part or completely, to measurement radiation, e.g. visible light. It is also preferred that the material has at least one window section, which can be an opening or a recess of the material. Preferably, the material has more of such window sections, in particular a number of N window sections, which preferably is equal to the number N of sensor devices of the pipetting apparatus. A window section preferably is arranged to face a sensor device, respectively, and in particular to face and/or cover the sensor area of a sensor device. Preferably, the window section(s) are configured to allow the measurement(s), which is/are performed by the sensor device(s), e.g. by being transparent for a measurement radiation. However, it is also possible and preferable for this material to be opaque to the measurement radiation.

The pipetting apparatus preferably has a connection device for connecting the pipetting container to the pipetting apparatus in a connection position. The pipetting container or an adapter element according to the invention is connected to the pipetting apparatus by a connection movement. The latter preferably extends parallel to an imagined axis, e.g. in the z-axis of a Cartesian coordinate system, which runs through the pipetting apparatus, or has at least one component parallel to this axis. The connection device is preferably designed as a plug-in connection and, to this end, has a latching device in particular, by means of which the pipetting container latches with the pipetting apparatus in the connection position.

The connection position is preferably the readout position of the pipetting container relative to the pipetting apparatus, in which the information from the information carrier is read out. Provision is preferably made for at least one connection position, in which a pipetting container can be connected to the pipetting apparatus. Provision is preferably made for several possible connection positions and/or readout positions, in which a pipetting container can be connected to the pipetting apparatus. The connection device is preferably configured in such a way that the connection position is established when the pipetting container is connected to the pipetting apparatus and the readout position is established at the same time. The connection of the pipetting container with the pipetting apparatus using this connection device preferably fixes the pipetting container in the connection position; this enables a reliable readout of the information. The connection device is preferably configured to allow the user to release the connection. The connection device is preferably designed for a positive and/or non-positive connection. In the case of positive connections, connections for securing the position between components or force transmission are created by the engagement of partial contours of the connection elements (see Dubbel, Taschenbuch für den Maschinenbau, [Handbook of engineering], $21^{st}$ edition, 2005, Springer Verlag, chapter G, 1.5.1).

The connection device preferably comprises a connection section, which, in particular, is designed for engaging into an engagement section, which is preferably provided on the pipetting container. The engagement section can comprise at least one projection and/or at least one recess. The information reading device is preferably arranged in this connection section and/or adjoining this connection section and is preferably connected to the latter in a non-detachable manner. As a result, it is possible to avoid an additional connection or positional securing of the pipetting container with the pipetting apparatus for the purposes of reading out the information.

The connection device is preferably designed to hold the pipetting container, in particular the at least one information section thereof, at a predetermined distance D from the pipetting apparatus, more particularly from the sensor section or the sensor area, in the connection position and, in particular, to prevent said distance dropping below a predetermined minimum distance D=D_min. The distance D is preferably measured perpendicular to the sensor area and/or parallel to the axis direction of the pipetting apparatus. What this can achieve is that the measurement or the readout of the information occurs in a reliable and reproducible fashion and that the sensor device in particular is not damaged by the connection of the pipetting container with the pipetting apparatus.

The pipetting apparatus preferably comprises a spacing device, which holds the information carrying device, more particularly the information section, at a predetermined distance D=D_min from the sensor device, in particular the sensor section, more particularly the sensor area, in the connection position, where preferably 0.000 mm<D_min<3.000 mm or preferably 0.000 mm<D_min<1.000 mm or preferably D_min=0.000 mm. The spacing device preferably comprises at least one stop element, on which at least one second stop element, which is preferably provided on the pipetting container, abuts when the pipetting container is connected to the pipetting apparatus and the connection position is established. The first stop element is preferably not this sensor section or the sensor area, but rather a separate stop element, which, in particular, absorbs shocks and vibrations when connecting or in the connection between the pipetting container and the pipetting apparatus and, in particular, prevents the sensor device from being damaged. However, in the process, it is possible that the pipetting container, in particular the at least one information section, touches the sensor section or the sensor area at least partly, completely or over a specific surface section in the connection position, since, in particular, this enables the measurement signal of an optical or capacitive measurement to be optimized. Particularly if the sensor section or the sensor area has sufficient mechanical stability, for example by virtue of having a protective layer, provision can also be made for the first stop element to be the sensor section or the sensor area, or to be a component thereof.

A minimum spacing D_min can be fixed by such an arrangement of stop elements. Such a spacing device is advantageous, particularly if the at least one sensor device operates according to an optical measurement principle in the first preferred embodiment of the invention or if the at least one sensor device operates according to a capacitive measurement principle in the second preferred embodiment of the invention. A precisely reproducible distance D is of great importance to both measurement principles in order to ensure a reliable measurement and the reliable operation of the pipetting apparatus.

However, maintaining the distance D is also important for other non-mechanical measurement principles.

The spacing device is preferably designed to increase the distance D if the pipetting container is rotated about an axis in relation to the pipetting apparatus or if it is moved with a movement component perpendicular to the axis. To this end, the spacing device comprises e.g. at least one first distancing element, which, in particular, can be a ramp element. The distancing element is preferably arranged in such a way that the distance D is increased in the case of such a movement, for example by virtue of a second distancing element, which is preferably provided on the pipetting container, interacting with the first distancing element. By way of example, the second distancing element can glide along a ramp of a ramp element in a direction perpendicular to the axis and, in the process, be displaced in the direction of the axis.

The pipetting apparatus preferably has an electric control device. The control device preferably has a signal connection to the information reading device. The control device is preferably configured to read out the information in accordance with a readout method by means of the information reading device. The readout method preferably provides for querying the sensor devices sequentially in time. As a result of the query, the at least one measurement value, measured by a sensor device, is made available to the control device such that it can be evaluated by an evaluation device of the control device.

The electric control device preferably comprises at least one printed circuit board and preferably comprises components with integrated circuits (ICs), which are preferably arranged on at least one printed circuit board. The control device preferably comprises programmable electric circuits. The control device preferably comprises a signal processing device, by means of which the at least one measurement signal is captured and used to control a function of the pipetting apparatus. The measurement value of the at least one sensor device can be available either as an analogue measurement signal, e.g. as an electric voltage signal, or as a digital value. The signal processing device is preferably configured to process analogue signals, which is referred to as an analogue signal processing device, by means of which, in particular, the at least one measurement value is captured as an analogue signal and used for controlling a function of the pipetting apparatus, more particularly evaluated in an analogue fashion. The signal processing device preferably comprises a digital data processing device, which, in particular, comprises a computer (CPU), data buses, data storage media, a microprocessor, one or more interfaces for apparatus-internal or apparatus-external data transmission, and/or one or more e.g. wired or wireless signal connections to other electric devices. It is particularly preferable for the data bus to be an $I^2C$ data bus ("inter-integrated circuit"), since the latter can be realized with relatively little installation space, few connections and relatively simple control programs, which is advantageous, particularly in the case of pipetting apparatuses, the installation space of which is limited in the region of the connection device for the connection to the pipetting container. The control device is preferably designed to capture the at least one measurement value digitally, in particular to process it digitally, in particular to evaluate it digitally and in particular to store it digitally.

The control device preferably has a measurement value storage medium, in particular a measurement data storage medium, for storing the at least one measurement value. As a result, different embodiments according to the invention of the pipetting apparatus can be realized. The measurement data storage medium is preferably housed in a physical rewritable memory chip, e.g. RAM, FLASH memory, EEPROM, but it can also be arranged in other memory chips.

The control device preferably has at least one program data storage medium, in which program code can be stored. The program code is preferably designed to use the at least one measurement value and to evaluate the latter.

In the present case, a pipetting apparatus or a control device, which is designed to form a specific function, is understood to mean such a pipetting apparatus or control device which is not only suitable in principle to carry out this function, e.g. after uploading software, but already has all means to carry out this function in actual fact, for example by virtue of already having the required program code or the required software, in particular in the form of firmware of the pipetting apparatus. The means for carrying out this function in particular comprise an evaluation device. In particular, the means for carrying out this function, in particular the evaluation device, can comprise e.g. appropriately designed electric circuits which, for example, evaluate an analogue signal, which represents the measurement value, and compare it to a reference signal (reference value) by means of e.g. a comparator circuit. These means can have a digital signal processing installation, particularly in the case of a digitally available measurement value. In order to evaluate the at least one measurement value, the control device preferably has an electric evaluation device.

The control device is preferably designed to start the readout method, preferably to start it automatically, i.e. in particular without further action by a user, if (in particular as soon as) a pipetting container is brought into the connection position to the pipetting apparatus, in particular by a user. The control device can be configured to start the readout method on the basis of an interrupt signal, which is preferably generated when the pipetting container is connected to the pipetting apparatus.

The control device can be designed to read out, successively in time, the number N>1 of sensor devices in a predetermined time pattern, more particularly cycle, which can in particular be prescribed by a time generator of the control device.

It is also possible and preferable for the readout method to provide for a simultaneous query of the sensor devices. The control device is preferably embodied to query a number N>1 of sensor devices simultaneously.

The readout method can also start with a time delay from the instant of the connection between the pipetting container and the pipetting apparatus in the connection position. In particular, this can ensure that this connection has been reliably established. The control device can be configured to carry out a test method before the readout method is started or the information obtained in the readout method is evaluated by means of an evaluation method. The test method can be integrated into the readout method. The test method can provide for checking the correct position of the pipetting container attached to the pipetting apparatus, preferably for determining a distance between the pipetting apparatus and a pipetting container attached to the pipetting apparatus and comparing it to a predetermined intended value. If the measured distance lies within an admissible range of the intended value, the readout method can be started automatically; otherwise it is possible to emit a warning signal to the user or an information processing system, for example via a user interface of the pipetting apparatus. The control device can be configured to use at least one sensor device of the information reading device for the test method. However, it is also possible and preferable for the pipetting apparatus to comprise another sensor element, which has a signal connection to the electric control device and which, in particular, can be a distance sensor. A measurement value established in the test method can, in particular, be used as a reference or calibration value for further measurements from the information reading device.

The information reading device and/or the control device is preferably configured to be calibrated by means of at least one calibration element. A calibration element preferably has at least one such information section or preferably a similar information section, which is also provided on the pipetting container according to the invention. In particular, a pipetting container can be used as calibration element. Here, a calibration element or a known pipetting container with a known arrangement of at least one information section is connected to the pipetting apparatus and the at least one measurement value, which is established by the at least one sensor device, is stored as reference value in the pipetting apparatus or the control device. It is preferable for at least one of the M distinguishable measurement states of a sensor device to be calibrated, or preferably for each of these measurement states to be calibrated, which can, in particular, be brought about by a number M_K=M of calibration elements. This calibration can be brought about at the manufacturing plant or can be carried out during servicing of the pipetting apparatus by the servicing team or the user. The calibration preferably takes place during a connection, preferably in the case of predetermined events, for example at a predetermined time or as the result of counting connections, or preferably at each connection, of a pipetting container according to the invention with the pipetting apparatus, by virtue of, in particular, at least one information section of the pipetting container being used automatically as calibration element in a test method.

The control device is preferably configured to carry out a test method, by means of which at least one standard state of the pipetting apparatus is checked. The standard state can be the equipped state or, preferably, the unequipped state of the pipetting apparatus, in which no pipetting container is connected to the pipetting apparatus. In particular, the test method can establish whether the sensor area is in an admissible state or whether cleaning of the sensor area or servicing of the pipetting apparatus is required. Depending on the result of the test method, it is possible, for example, for the pipetting apparatus to emit a warning signal to the user via a user interface of the pipetting apparatus. It is furthermore possible to establish whether the pipetting apparatus is equipped. The result can be evaluated automatically and can bring about a further step, e.g. a change in the operating state of the pipetting apparatus, e.g.—depending on the time—into a rest state, in which less energy is used than in the operating state, in which pipetting is possible.

The at least one sensor device is preferably configured to measure a capacitance, more particularly the capacitance in the measuring space. The sensor device is preferably configured in accordance with the principle of the capacitive proximity switch. In the process, an electric capacitance value is measured, in particular the dielectric constant $\epsilon_r$ of the measuring space. As a result of inserting the information section into the measuring space, the capacitance value of the latter changes, which can be captured. The size of this capacitance value can, in particular, depend on the distance of the information section from the sensor section, more particularly the sensor area. It can furthermore depend on the material of the information section. In this or in a similar manner, the information content of the information section can be fixed and be determined as uniquely distinguishable measurement state by the capacitive sensor device. A preferred embodiment of an information reading device in accordance with the second preferred embodiment of the pipetting apparatus according to the invention therefore has a carrier substrate, which, in particular, is a laminated substrate, which comprises an electrode arrangement with electrodes engaging in a finger-like manner on its upper side, which carrier substrate forms a sensor device.

The information reading device, in particular the at least one sensor device, is preferably arranged on a substrate. This substrate is preferably a plate-like component, which, in particular, is arranged perpendicular to the axis in the pipetting apparatus. This substrate is preferably fixedly connected to the guide device, i.e. when the pipetting apparatus is used as intended, it cannot be displaced in relation to the guide device which guides the connection movement. Provision is preferably made for a connection device which fixedly connects the substrate and the guide device such that there is no change in the relative position between substrate and guide device under normal operating conditions, i.e. when using the pipetting apparatus as intended. This connection can be a direct connection between the guide device and the substrate or the substrate and the guide device can be fixedly connected indirectly to one another via a further component of the pipetting apparatus. What this fixed connection brings about is that the connection position can be created in a reliable and reproducible fashion and the readout of the information can always occur reliably.

The substrate can be a printed circuit board or be connected to a printed circuit board, in which electric lines are integrated. The lines can, particularly in the region of the sensor device, be arranged on one side and/or on both sides and/or in several layers on this printed circuit board. The printed circuit board is preferably a deformable, at least in sections, more particularly at least partly elastically deformable, printed circuit board, and so the arrangement thereof in the pipetting apparatus is more flexible. The substrate is preferably designed not to be deformable in the region of the sensor devices in order to ensure a reliable arrangement of the sensor devices in relation to one another and, in particular, in relation to the pipetting apparatus and the pipetting container connected to the latter.

The sensor device preferably has at least one electrode, which, in particular, is embodied parallel to the sensor, more particularly the sensor area. The electrode can have a planar electrode surface or have a line-like profile, which, in particular, can follow a straight line or several straight lines or one or more curved lines. In particular, the electrode can have a meandering profile. In the case of a capacitive sensor device in particular, provision can be made for a second electrode, which, in particular, is connected to ground and is arranged at a distance from the first electrode and can, in particular, extend parallel to this first electrode. Paired electrodes can respectively have finger elements, which are arranged in an intercalated or comb-like fashion with respect to the finger elements of the opposite electrode. These electrodes can be arranged in a meandering intercalated fashion. A first electrode can be configured as a core electrode, in particular as a circular electrode, and the second electrode can, as a hole electrode, be arranged substantially in the plane of this core electrode, outside of the core area of the core electrode, such that the core electrode is arranged in the hole of the hole electrode. The second electrode can also be arranged parallel to the core electrode, more particularly under the core electrode, and can, in particular, be embodied as a cup electrode, by virtue of at least one side wall of the cup electrode, proceeding from a base section of the cup electrode, rising up to level with the core electrode, wherein the electrodes, in particular, are always spaced apart.

The sensor device preferably comprises at least one transmitter element and at least one receiver element, which are preferably arranged parallel to a sensor area of the sensor section. The transmitter element and the receiver element are preferably arranged within this sensor area. The advantage offered thereby is that the sensor device can have a compact design and that, in particular, the transmitter element and the receiver element can be arranged opposite (more particularly perpendicularly opposite in relation to the sensor area) to this measuring space and hence opposite the at least one information section. The transmitter element and the receiver element are preferably arranged at a minimum distance D_SE from one another, which distance is, in particular, small or even equal to 0, where, preferably, 0<=D_SE<=1.00 mm or preferably 0<=D_SE<=5.00 mm.

It is also possible and preferable for the at least one transmitter element and the at least one receiver element to be arranged lying opposite one another on opposite sides of the measuring space or of a section of the measuring space. In this manner, it is possible, in particular, to realize a sensor device operating according to the principle of a photoelectric barrier. A logical "1" can be realized by virtue of an information section being arranged in the measuring space of the photoelectric barrier, which information section interrupts the light transmission. The uninterrupted reception can represent a logical "0", by virtue of, in particular, no information section being arranged in the measuring space. This sensor device is preferably configured to measure the penetration depth of an information section into such a measuring space. To this end, use can be made of a receiver element with a suitable spatial resolution, or it is possible to make use of a plurality of receiver elements or transmitter elements arranged above one another or next to one another, wherein provision can be made for a number of opposite complementary transmitter elements and receiver elements or wherein provision can be made for another number of, e.g. a lower number of, e.g. in each case only one, complementary element(s) (transmitter or receiver element).

The at least one sensor device is preferably configured to measure an optical property of the information section, in particular to measure an optical signal reflected by an information section.

The transmitter element of an optical sensor device is preferably a vertically emitting laser (VCSEL) since such light sources simultaneously have high luminous intensity, in particular a low energy use and more particularly a relatively low ratio of luminous intensity/energy use in the case of a compact design, which can be integrated onto the IC substrate.

Furthermore, the transmitter element of an optical sensor device is preferably an LED, in particular an infrared LED. The use of a light source of visible light, in particular with wavelengths between 380 nm and 780 nm, offers the advantage of the sensor function being easier to check by the user and furthermore of visible light being well-suited to reflection arrangements in order to reflect the emitted light and receive it again. The use of infrared light, in particular with wavelengths of between 780 nm and 1000 nm, offers the advantage of the sensor area being able to be covered by a material layer, non-transparent to visible light, more particularly a protective layer or dirt, which increases the selection of available material layers compared to the use of visibly emitting LEDs and makes the readout more reliable.

A pipetting apparatus according to the first preferred embodiment preferably has the following features and advantages, either alone or in combination:

The information reading device is preferably configured to carry out the readout on the basis of the level of an optical reflection signal, wherein, particularly at the positions of a sensor device in the information reading device, an optical transmitter element and a light-sensitive receiver element, which, in particular, is assigned to the former and arranged in the reflection field, are positioned and attached, wherein, in particular, the emitted light is reflected back by a defined formed reflection geometry on an outer side, on a collar or an edge of the pipetting container to the receiver element and generates an evaluable photoelectric current.

A vertically emitting laser (a so-called VCSEL) is preferably arranged as the chip on the transmitter element. A pin photodiode as a chip, which in particular has a photosensitive surface, which, in particular, is sufficiently large to capture as much of the reflected light as possible, is preferably arranged in the reception region of the receiver element. The photodiode is preferably arranged next to the transmitter. The transmitter element can preferably be positioned directly on the receiver element.

For readout purposes, the transmitter elements are preferably successively actuated individually in a clocked fashion and the associated receiver elements are successively queried in a clocked fashion and, in particular, the electric levels are evaluated in terms of their intensity.

The transmitter element and the receiver element are preferably arranged together on one sensor printed circuit board and are, in particular, sealed by a cap which is optically transparent to the transmission wavelength and may serve as a stop for the upper edge of the pipette. This sealing cap is preferably made of a material which is substantially transparent to the transmission wavelength only. Alternatively, the surface is preferably equipped with a filter layer, which is substantially transparent to the transmission wavelength only. The interspace between transmission element and receiver element is preferably encapsulated with an optically transparent material which, in particular, substantially has the same refractive index as the sealing cap and through which radiation passes during operation of the sensor.

Geometry sections (i.e. in particular, geometric designs of the pipetting container or one of its components) are preferably arranged on the outer side, on the collar or on the edge of the pipetting container, which geometry sections are preferably arranged over the transmitter elements during the readout and in particular are designed in such a way that they reflect light with a defined intensity or that light passes through them in a defined fashion (particularly in the case of transparency of the geometry sections) such that these defined levels and hence defined measurement states of the measured measurement signal can be assigned. In the case of transparent materials of the pipetting container or of the at least one information section, provision is preferably made for such geometry sections to be employed that employ the total internal reflection by virtue of, in particular, at least one prism element being formed on the pipetting container or on the information reading device, which prism element, on the angled prism walls, to the greatest part totally reflects the light reaching the collar or edge of the pipetting container through the outer side and hence reflects said light to the receiver element.

In the case of transparent materials of the prism element, a third level is preferably reached by virtue of the fact that this prism element is tilted in such a way that substantially half of the light is reflected because part of the light can pass through the angled wall. When evaluating the levels, the processor preferably calculates a dynamic threshold for evaluation, such that the values can be assigned specific classes. Here, use is preferably made of a reference value which can be determined in a test method of the pipetting apparatus. In order to avoid the influence of surrounding light, provision is preferably also made for the transmitter elements and receiver elements to be clocked in such a way that the unclocked surrounding light can be filtered out electronically (e.g. according to the lock-in principle).

The invention furthermore relates to a pipetting container for use with a pipetting apparatus, in particular according to the invention, which pipetting container on a container side comprises a first connection section, by means of which the pipetting container can be connected to the pipetting apparatus, and which pipetting container comprises an information carrier device with at least one information section.

The invention furthermore relates to an adapter element, which can be connected to a pipetting container, for use with the pipetting apparatus according to the invention, which on one adapter side comprises the first connection section, by means of which the adapter element and hence the pipetting container connected thereto can be connected to the pipetting apparatus, wherein the adapter element comprises an information carrier device with at least one information section. In this case, provision can be made, in particular, for the user to assemble the adapter element, which carries the fitting information, on the pipetting container, which pipetting container can, in particular, be a commercially available pipetting container and, more particularly, a pipetting container not according to the invention.

The adapter element comprises a connection device, by means of which the adapter element can be connected to this pipetting container in a detachable or non-detachable manner, by means of which the adapter can more particularly be connected to an end face of the pipetting container, which lies opposite to the passage opening thereof for the fluid. The connecting device is preferably arranged on the side of the adapter element which lies opposite to the at least one information section. This is how a pipetting container not according to the invention can be adapted in such a way that it interacts with the pipetting apparatus according to the invention, more particularly with the information reading device thereof, in order to achieve the advantages according to the invention of such a pipetting system. The explanations made in this description in respect of the at least one information section on a pipetting container according to the invention apply equally well to the at least one information section on an adapter element according to the invention. Preferred refinements of the pipetting container according to the invention therefore apply analogously to the adapter element according to the invention. A pipetting container provided with an adapter element according to the invention is a pipetting container according to the invention.

The invention furthermore relates to a set of several such adapter elements, in which each adapter element carries different, specifically adapter-specific, information. The adapter element preferably comprises a connection device for the connection to a pipetting container, which connection device more particularly has pipetting container-specific design, such that a specific type of adapter element can only be connected to a specific type of pipetting container. As a result, incorrect equipping of the adapter element and, in particular, incorrect determining of the information, more particularly the maximum volume of the container, by means of the information reading device can be avoided.

A pipetting container is a container, which comprises at least one wall, more particularly at least one side wall and at least one end wall, which delimits an interior, and an opening, through which a fluid can preferably be suctioned into the interior and preferably be re-dispensed, in particular by gravity and/or positive pressure. The container preferably has a cylinder-like interior and, in particular, a movable plunger arranged therein, by means of which a pressure change in particular can be effected in the interior. The container has a connection section, referred to as first connection section, which can be connected to the connection device or the connection section of the pipetting apparatus and which is arranged on a container side, preferably on an end wall of the container. In the connection position, the connection section of the container is preferably fixedly connected to the pipetting apparatus and more particularly connected to the main body of the latter. The connection section preferably comprises an engagement section and, in particular, comprises at least one recess section and/or at least one projection element or flange, or is formed by the latter. By means of such a component, it is possible to achieve a positive connection between pipetting container and pipetting apparatus. The information carrier device is preferably also arranged on the container side on which the first connection section is arranged.

The information carrier apparatus, in particular the at least one information section, is preferably fixedly connected, i.e. cannot be detached without destruction, to the container side and preferably integrally connected to the container side, more particularly produced by a casting method using plastic. The at least one information section preferably extends in the axial direction in the connection position. The at least one information section is preferably configured to be moved in the axial direction, in particular by a translational connection movement of the pipetting container, more particularly in the direction of the at least one measuring space, and, in particular, to engage with the at least one measuring space. When in the measuring position, the at least one information section is preferably arranged adjoining the measuring space or in the measuring space.

It is preferable for provision to be made for several information sections, more particularly a number N of information sections which, in particular, corresponds to the number of sensor devices. These are preferably arranged parallel to a plane and, in particular, are arranged next to one another on the container side. Several information sections can be arranged along a circular path, in particular distributed in a rotationally symmetric or non-rotationally symmetric manner, more particularly distributed in an asymmetric manner.

A pipetting container is preferably a dispenser tip, but can also be e.g. a pipette tip. The dispenser tip operates according to the syringe principle. It comprises a container cylinder, the volume of the fluid receptacle space of which is varied by a plunger arranged in the cylinder. In the connection position, the plunger is preferably coupled to a movement device of the pipetting apparatus such that this volume is controlled by the dispenser. The at least one information section is preferably fixedly, more particularly integrally, connected to a container side of the dispenser tip and, in particular, not connected to the plunger of the dispenser tip.

A conventional pipetting container is one which was commercially available at the filing date of the present patent application or thereafter. In particular, a conventional pipetting container is a pipetting container which is not configured according to the invention.

The at least one information section is preferably designed for the predetermined reflection of a specified optical signal, in particular for total internal reflection, more particularly for at least partial or substantially complete total internal reflection of a specified optical signal. Total internal reflection can, in particular, be achieved by the use of optically reflecting or light-transmissive materials with suitable refractive indices. Total internal reflection occurs when light, travelling through an optically denser medium, e.g. transparent plastic, impinges on an interface within a certain critical angle, behind which interface there is an optically less dense medium, e.g. air. The information section preferably has a prism element, which, in the connection position, is designed and arranged for reflection, more particularly total internal reflection, of light incident from the direction of the sensor device. The information section preferably comprises one or more reflection sections, by means of which incident light is reflected in a predetermined fashion such that the reflected light is characteristic to the information section. If a measurement resolution of M=3 is to be obtained, it is merely necessary for three configurations of reflection sections to be prescribed, which, in a predetermined fashion, reflect incident light in a predetermined and distinguishable fashion such that the measurement state can be uniquely determined by the at least one sensor device.

The at least one information section is preferably configured for a predetermined change in the capacitance value of a measuring space in which the information section is arranged.

Furthermore, a pipetting system is considered to be inventive if it comprises a pipetting apparatus according to the invention and at least one pipetting container according to the invention or a set of pipetting containers according to the invention, or at least one adapter element according to the invention or a set of adapter elements according to the invention, wherein such a pipetting container or such an adapter element is respectively configured for use with the pipetting apparatus and, in particular, for interaction with the information reading device of the latter. The pipetting containers of a set of pipetting containers according to the invention preferably each have a different, namely pipette container-specific, maximum volume and the at least one information section thereof preferably in each case carries different, namely pipette container-specific, information which, in particular, allows an inference to be made in respect of the type and/or the maximum volume of the respective pipette container.

The use of a pipetting container according to the invention for a connection to a pipetting apparatus according to the invention is furthermore considered to be inventive. The pipetting container can preferably also be used with a conventional pipetting apparatus, in particular if the connection connectors are suitable, namely designed in a conventional fashion; in this case, the design according to the invention of the pipetting container is such that use with a conventional pipetting apparatus is also possible. This offers greater flexibility for the user.

The use of a pipetting container according to the invention for providing information attached to an information carrier device of the pipetting container is also considered inventive, which information can be established by a pipetting apparatus according to the invention. Here, the use of the pipetting container according to the invention for establishing this information with the pipetting apparatus according to the invention is furthermore inventive.

The invention furthermore relates to a method for producing a pipetting container according to the invention or an adapter element according to the invention, comprising the steps that use is made of a casting method, in particular an injection moulding method, in order to produce, in particular, a disposable laboratory pipetting container or an adapter element, more particularly to produce the at least one information section integrally with at least one further component of the pipetting container or the adapter element. The method preferably provides for the pipetting container or the adapter element to be produced from a single material. However, it is also possible and preferable for the pipetting container or the adapter element to be produced from two or more materials and, in particular, from several parts. At least one region of the pipetting container or the adapter element, in particular the at least one information section, is preferably coated, in particular vapour deposited, more particularly with a metallic layer, in order, preferably, to improve the measurement signals by virtue of, for example, the reflectivity being increased compared to a signal, in particular optical signal, transmitted by the sensor device.

The pipetting container, which can be connected to the connection section of the pipetting apparatus, is preferably configured to hold a fluid volume. This container can be a pipette tip or dispenser tip, which, in particular, can in each case have a movable plunger. In the last-mentioned case, the container is more particularly designed according to the syringe principle and is also referred to as syringe container. These containers are preferably made of plastic and are preferably consumables, i.e. are preferably disposed of rather than cleaned after a single use. However, they can also be made of different materials and, in particular, be reusable.

Preferred embodiments of the pipetting container according to the invention can furthermore be derived from the description of the pipetting apparatus according to the invention and the preferred embodiments thereof. Preferred embodiments of the pipetting apparatus according to the invention can furthermore also be derived from the description of the pipetting container according to the invention and the preferred embodiments thereof.

Further preferred embodiments of the pipetting apparatus according to the invention and the pipetting container according to the invention, and further aspects of the invention, emerge from the following description of the exemplary embodiments in conjunction with the figures. The same reference signs substantially denote the same components.

FIG. 1 shows an exemplary embodiment of the pipetting apparatus according to the invention, which in this case is an electric dispenser, to which a pipetting container according to the invention, embodied as dispenser tip, is connected.

Figures 2A, 2B:
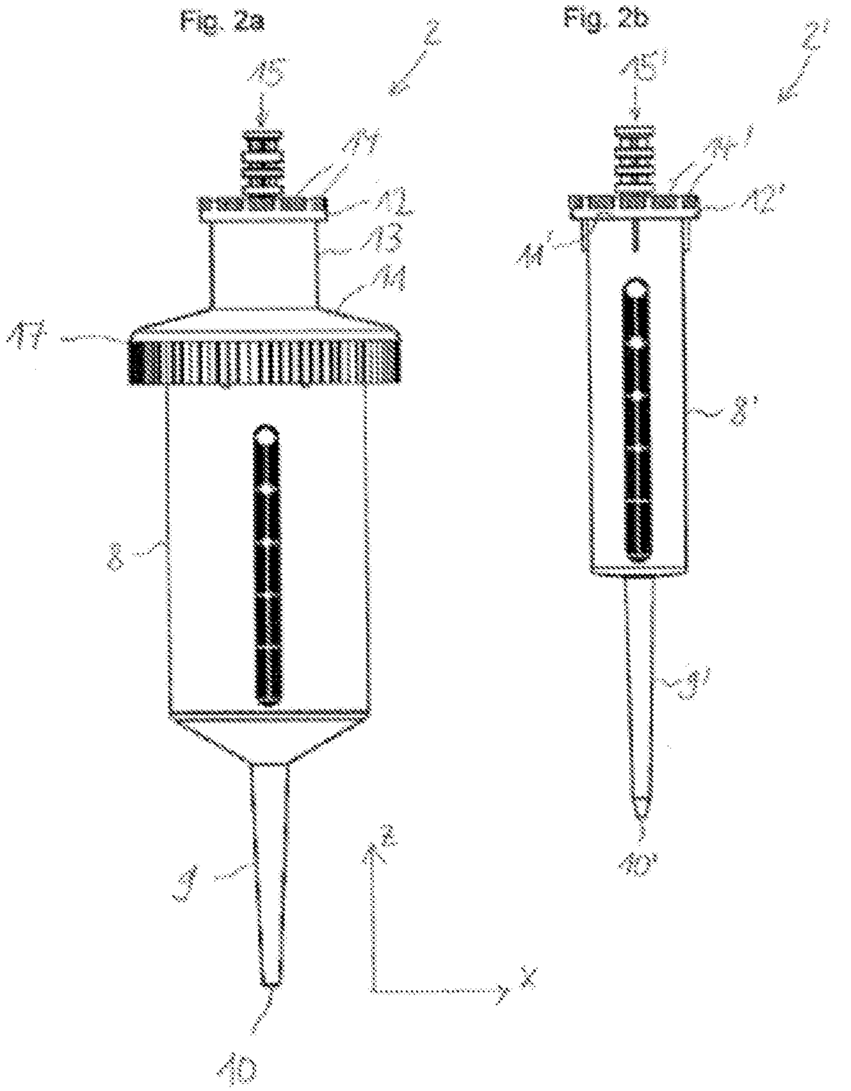

FIG. 2*a* shows the dispenser tip from FIG. 1.

FIG. 2*b* shows a further exemplary embodiment of a pipetting container according to the invention.

Figure 3:
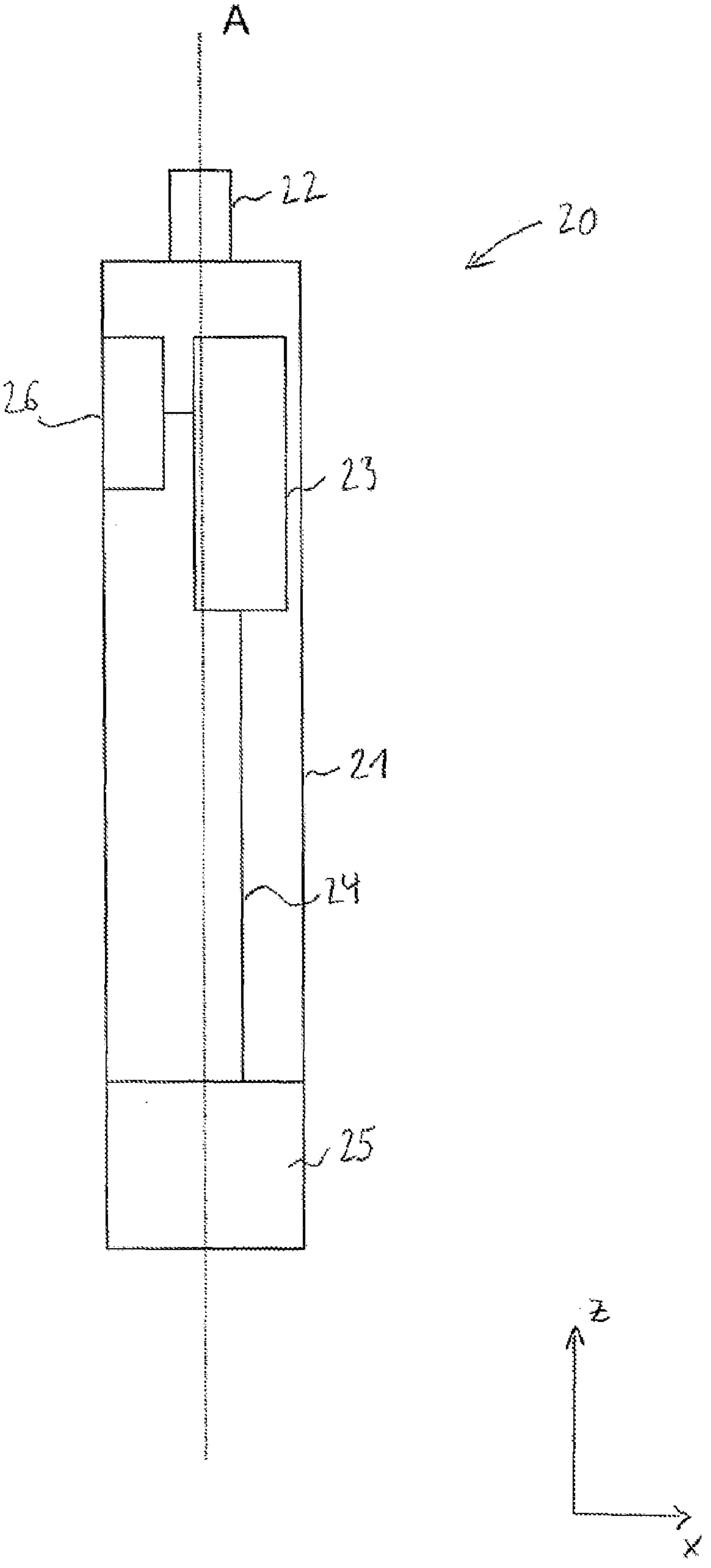

FIG. 3 schematically shows the design of the pipetting apparatus according to the invention in one exemplary embodiment.

Figure 4A:
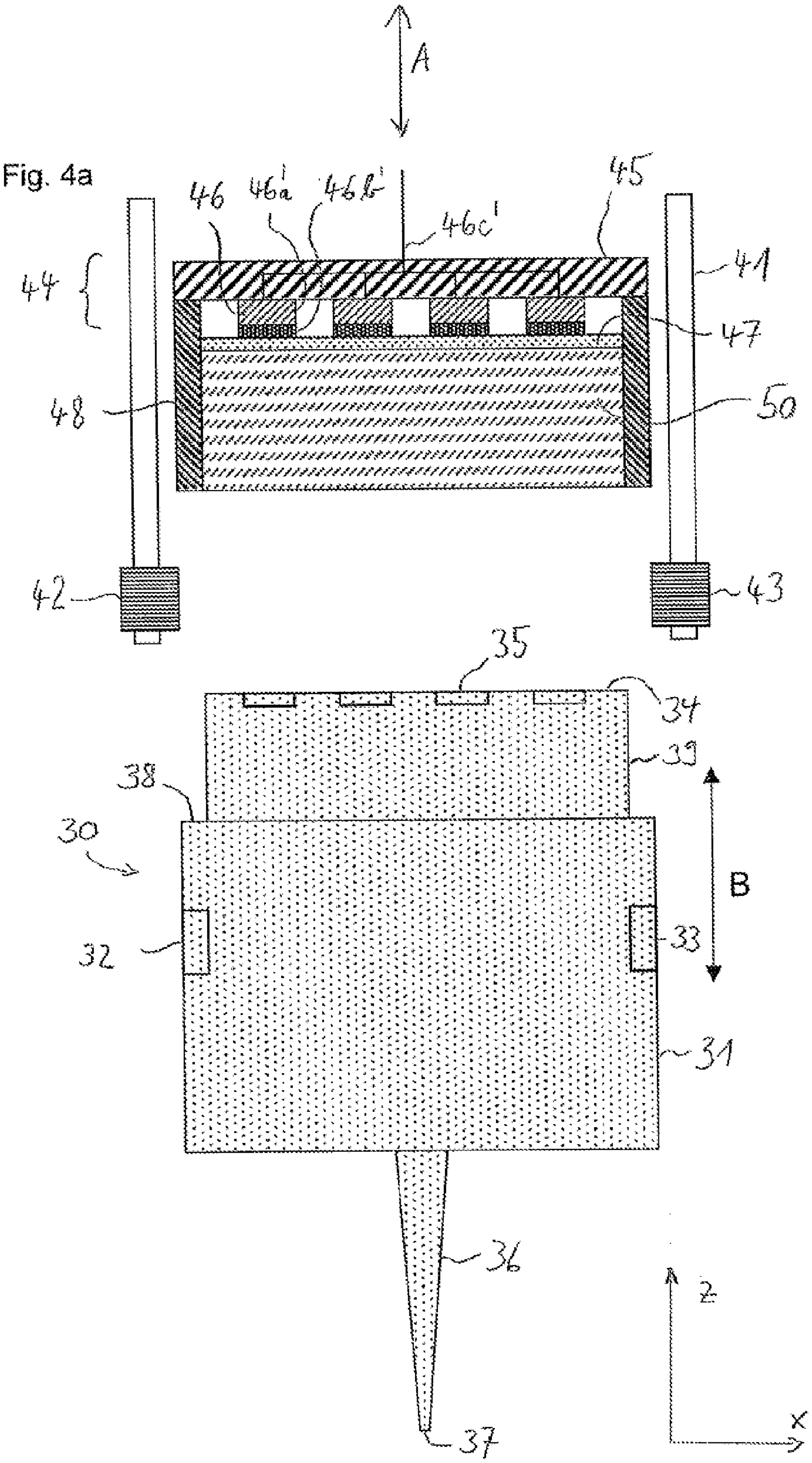

FIG. 4*a* schematically shows the connection section from the pipetting apparatus of FIG. 3, and shows a further exemplary embodiment of a pipetting container according to the invention.

Figure 4B:
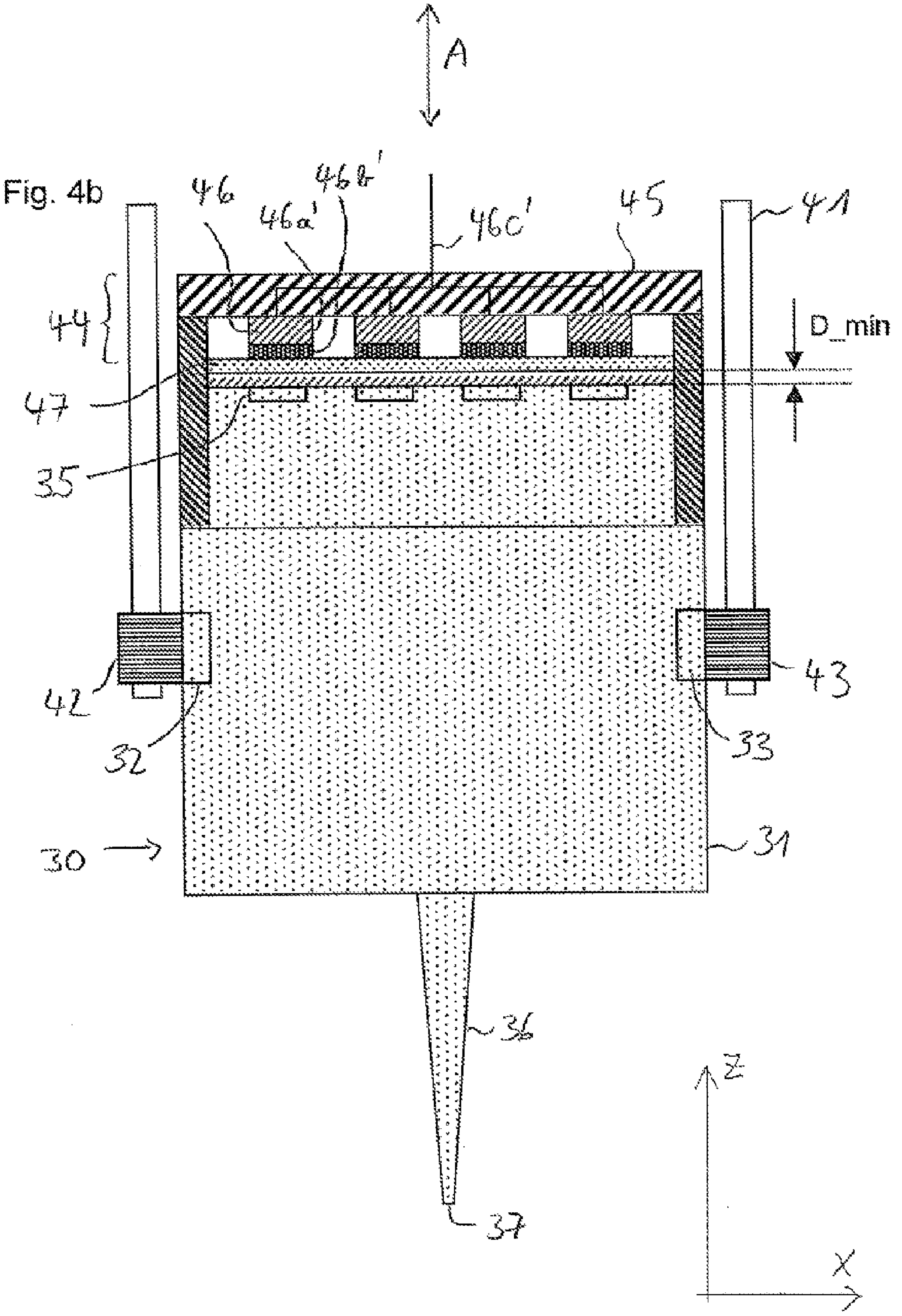

FIG. 4*b* corresponds to FIG. 4*a*, wherein the pipetting container is arranged in the connection position and connected to the pipetting apparatus.

FIGS. 5*a*, 5*b*, 5*c*, 5*d*, 5*e*, 5*f*, 5*g*, 5*h* and 5*i* respectively show a preferred embodiment of the arrangement of sensor devices in relation to an information reading device of a pipetting apparatus according to the invention.

FIGS. 6*a*, 6*b*, 6*c*, 6*d* and 6*e* respectively show a preferred embodiment of a sensor device of an information reading device of a pipetting apparatus according to the invention.

Figure 7A:
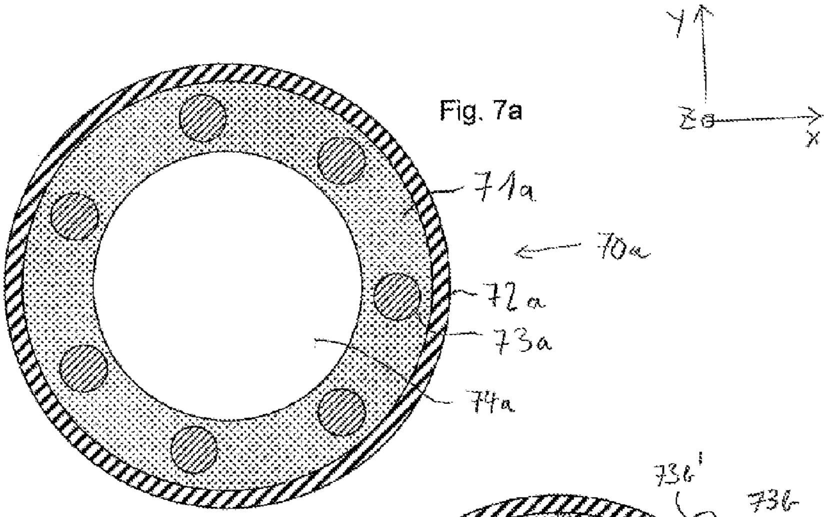
Figure 7B:
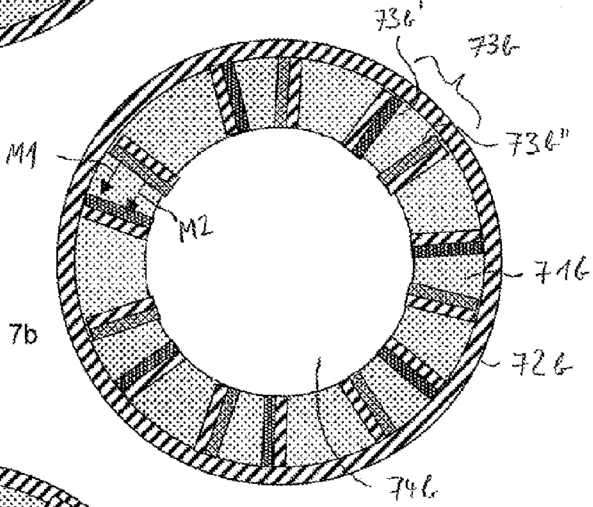
Figure 7C:
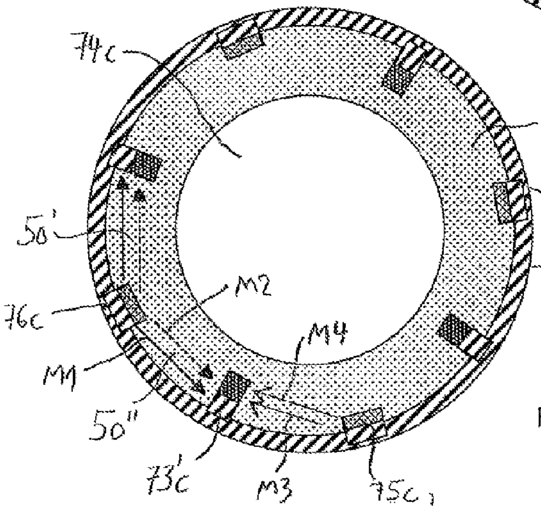

FIGS. 7*a*, 7*b* and 7*c* respectively show a view of a preferred embodiment of an information reading device of a pipetting apparatus according to the invention, with an annular carrier substrate and sensor devices arranged along an annulus.

Figure 8A:
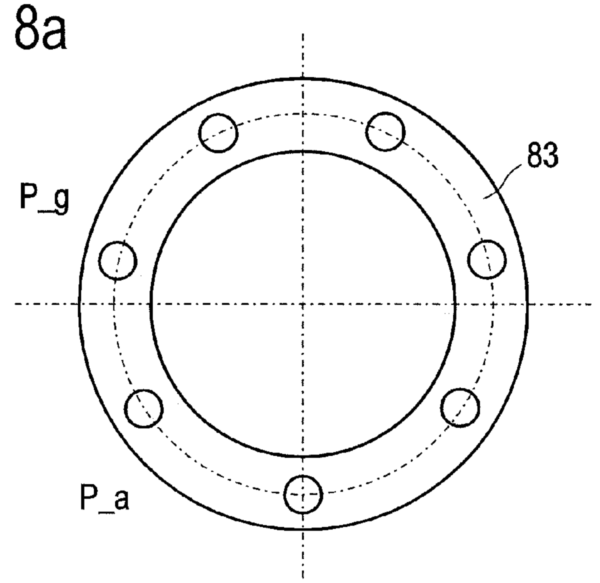

FIG. 8*a* shows an arrangement of sensor devices, in which optical sensor devices are arranged in accordance with the first preferred embodiment of the pipetting apparatus according to the invention.

Figure 8B:
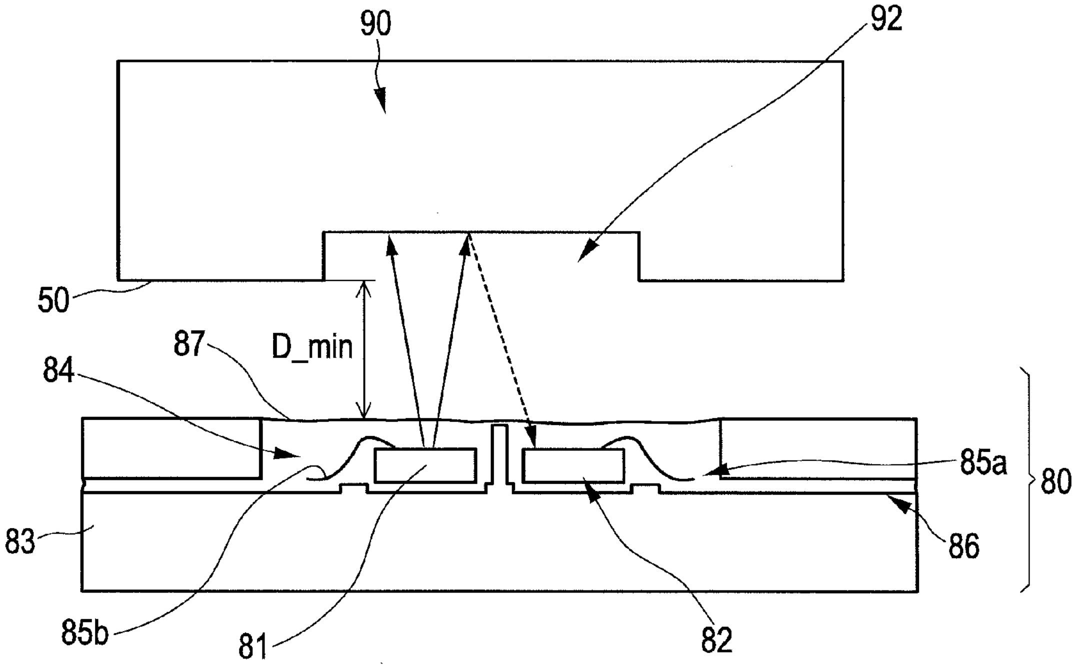

FIG. 8*b* shows an optical sensor device for measuring a characteristic light reflection, which can be used in the first preferred embodiment of the pipetting apparatus according to the invention.

Figure 9:
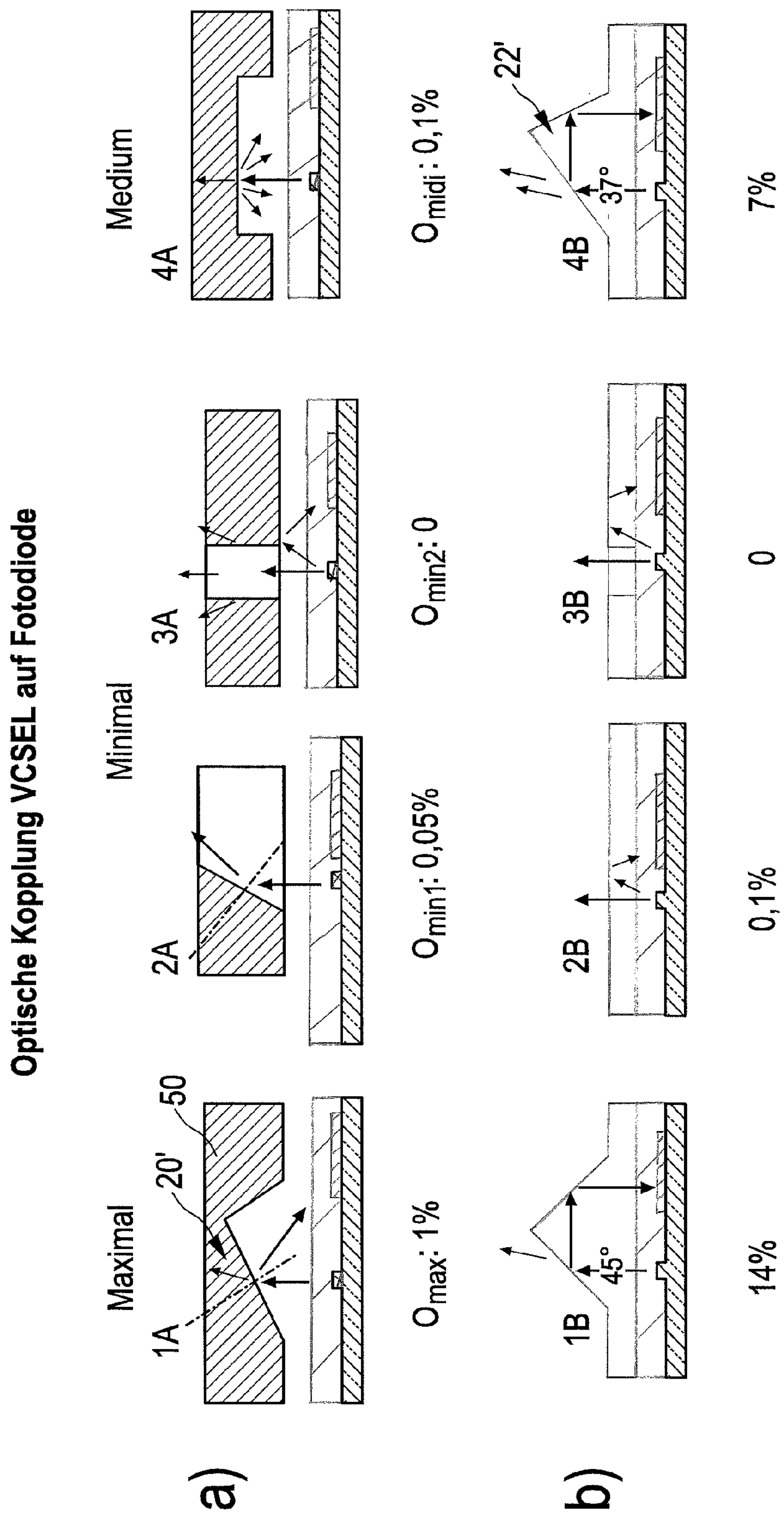

FIG. 9*a* shows different measurement states of the optical sensor device from FIG. 8*b*, respectively with a different preferred embodiment of an information section, not transparent to light, for a pipetting container according to the invention.

FIG. 9*b* shows different measurement states of the optical sensor device from FIG. 8*b*, respectively with a different preferred embodiment of an information section, transparent to light, for a pipetting container according to the invention.

Figure 10A:
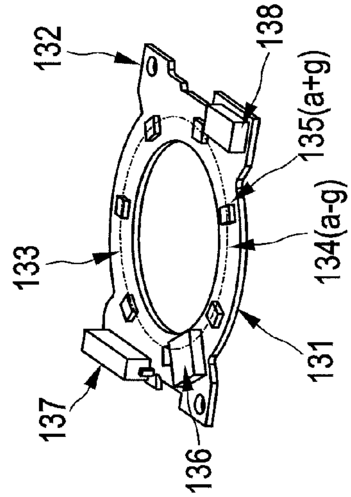

FIG. 10*a* shows an isometric view of an information reading device, which comprises the arrangement of sensor devices as per FIG. 8*a* and the sensor devices as per FIG. 8*b*.

Figure 10B:
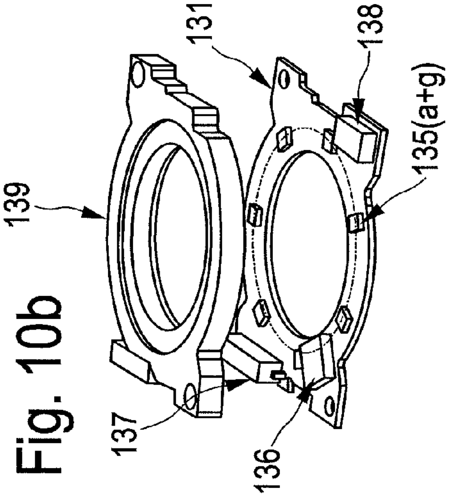

FIG. 10*b* shows an isometric view of the information reading device from FIG. 10*a* with a protective cap arranged thereabove.

Figure 10C:
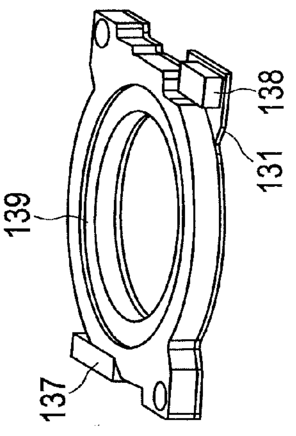

FIG. 10*c* corresponds to FIG. 10*b*, wherein the protective cap is arranged in its assembly position.

Figure 10D:
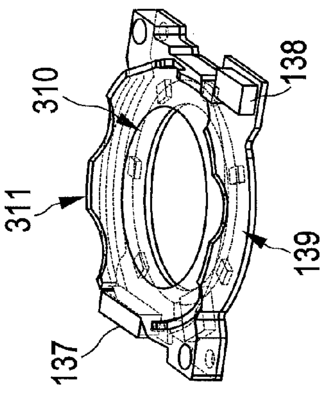

FIG. 10*d* corresponds to FIG. 10*c*, wherein a spacing device is additionally shown.

Figure 10E:
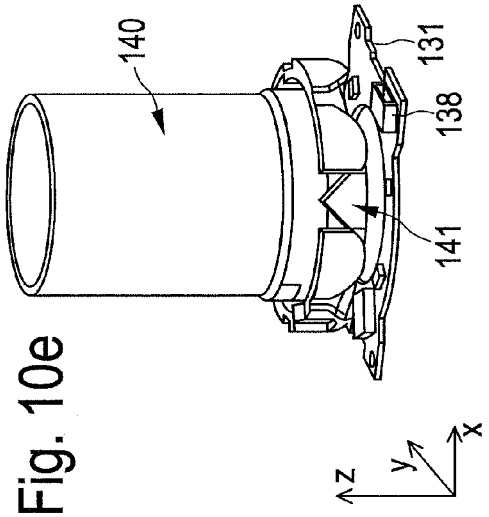

FIG. 10*e* isometrically shows the information reading device from FIG. 10*a*, and a portion of a pipetting container according to the invention which is arranged in the connection position.

Figure 10F:
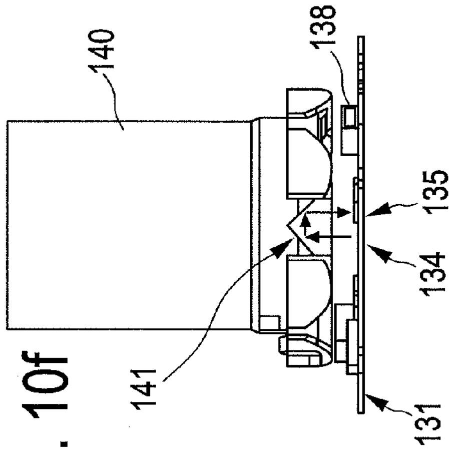

FIG. 10*f* is a side view of FIG. 10*e*, with the beam path during the optical measurement of a sensor device being shown.

Figure 11A:
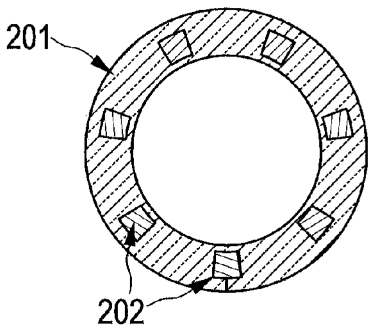

FIG. 11*a* shows an arrangement of sensor devices, in which capacitive sensor devices are arranged in accordance with the second preferred embodiment of the pipetting apparatus according to the invention.

FIG. 11 *b* shows a cross section of the design of a capacitive sensor device, which can be used for the second preferred embodiment of the pipetting apparatus according to the invention.

Figures 12A, 12B, 12C:
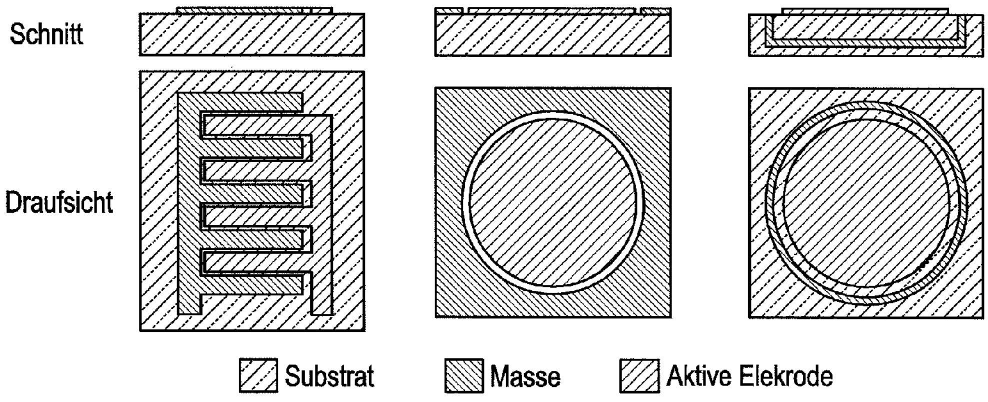

FIGS. 12*a*, 12*b* and 12*c* respectively show a lateral cross section and a view of a preferred embodiment of the electrode arrangement of a capacitive sensor device, which can be used for the second preferred embodiment of the pipetting apparatus according to the invention.

In the figures explained below, use is made of a Cartesian coordinate system in order to explain the relative positions of the components of the pipetting apparatus according to the invention and of the pipetting container according to the invention. The directional designation "up" corresponds to the direction of the positive z-axis.

FIG. 1 shows an exemplary embodiment of the pipetting apparatus according to the invention, which in this case is an electric manual dispenser 1 for aspiring and dispensing liquid laboratory samples, to which a pipetting container according to the invention, designed as a dispenser tip 2, is connected. The dispenser 1 comprises a main body 3, which, in its upper section 4, comprises an optical display 5, by means of which the user obtains e.g. information in respect of the identified pipetting container, in respect of the sample volume of the liquid laboratory sample contained in the pipetting container and in respect of the set dispensing volume, which should be dispensed in a dispensing step, or other information. The dispenser 1 is configured to read out information contained on the information carrying device of the dispenser tip 2 by means of the information reading device. From this information, the dispenser 1 automatically determines the type of dispenser tip 2, in particular the maximum volume thereof. As a result of this information, the pipetting apparatus 1 is able, in particular, to calculate the required plunger stroke from a dispensing volume prescribed by the user. Said plunger stroke depends, in particular, on the cross section (perpendicular to the z-axis) of the cylindrical internal volume of the container of the dispenser tip 2. By means of the actuation element 6, the user can start the dispensing of the dispensing volume or the take-up of a volume. The dispensing process and the take-up process are moreover controlled automatically by the dispenser 1. A movement device (not shown) in the interior of the main body 3 moves the plunger arranged in the dispenser tip 2, as a result of which a liquid is dispensed or taken up by means of a pressure change in the interior volume of the container.

In a connection position, the dispenser tip 2 is fixedly connected to the main body 3 of the pipetting apparatus. By means of a connection device (not shown here), the dispenser tip 2 can be plugged onto the connection section of the pipetting apparatus 1 by the user. The connection can be released by the user by means of the unlocking button 7 of the pipetting apparatus.

FIG. 2*a* shows the dispenser tip 2 from FIG. 1 with a maximum volume of 50 ml. The dispenser tip 2 has a cylinder-like container 8, at the lower end of which a hollow cone-shaped tip 9 with a container opening 10 is arranged. Opposite to the container opening 10, the dispenser tip comprises the adapter element 17, which forms the end wall 11, embodied as cover section, of the pipetting container and which is detachably connected to the container 8. However, the end wall of the container can also be integrally connected to the container 8 and the adapter element can be arranged parallel to this end wall. The cover section 11 has a cylinder-like extension projection 13, at the end of which the connection section, embodied as connection flange 12, is formed integrally. Hence the connection section 12 is fixedly connected to the adapter element 17, and the adapter element 17 is fixedly connected to the container 8 of the pipetting container 2.

FIG. 2*b* shows another exemplary embodiment of the pipetting container 2', the dispenser tip 2' with a maximum volume of 10 ml, in which the information carrying device is integrally connected to the container 8' of the pipetting container 2'. The dispenser tip 2' has a cylinder-like container 8', at the lower end of which a hollow cone-shaped tip 9' with a container opening 10' is arranged. Opposite to the container opening 10', the dispenser tip comprises the end wall 11' (not visible) of the container, which is integrally connected to the container 8'. The connection section, embodied as connection flange 12', is formed integrally onto this end wall 11'.

On the side facing away from the container, the connection section 12 (or 12') comprises a multiplicity of information sections 14 (or 14') of the information carrying device of the dispenser tip. The information sections are arranged along a circular path on the connection section in such a way that they concentrically surround the plunger 15 (or 15'). FIG. 2*a* and FIG. 2*b* only show the upper end of the plunger of the dispenser tip, which is configured as an attachment section serving for the attachment with the movement device of the dispenser. The information is coded onto the information sections in such a way that it can be read out and captured around the z-axis, independently of the angular position of the rotation of the pipetting container. The information contained on the information sections of the pipetting container denotes the type of pipetting container, in particular the pipetting container-specific maximum volume thereof.

FIG. 3 schematically shows the design of the manual pipetting apparatus 20 according to the invention, in an exemplary embodiment. The pipetting apparatus 20 has a main body 21, which is designed as a handle section and extends along an imagined axis with the axial direction A and on the upper end of which an actuation element 22 which can be operated manually by the user is provided. The pipetting apparatus 20 has an electric control device 23. The control device comprises a signal processing device for processing measurement signals from the sensor devices arranged in the lower region 25 of the main body, which sensor devices are connected to the control device by a signal line device 24. The control device furthermore has a data processing device for digital processing of data, which, in particular, serves as evaluation device for evaluating the measurement signals. The control device is furthermore designed to determine the information from the measurement signals which allows a unique inference to be drawn in respect of the pipetting container connected to the pipetting apparatus 20. Furthermore, the control device is designed to control precisely the process of dispensing a liquid volume and of taking up a liquid volume, depending on parameters which are entered by the user by means of the user interface 26.

The second connection section of the pipetting apparatus is situated in the lower region 25 of the main body of the pipetting apparatus 20, in which section a connection device is provided to connect a pipetting container according to the invention to the pipetting apparatus 20.

FIG. 4*a* schematically shows a connection section, which, for example, can be provided on the pipetting apparatus 20 from FIG. 3, and shows a further exemplary embodiment of a pipetting container 30 according to the invention. The pipetting container 30 comprises a container 31 with a hollow cone-shaped tip 36 with the container opening 37, through which opening a liquid laboratory sample can be suctioned into the container and re-dispensed therefrom. Connection elements 32, 33 are provided on at least two opposing sides of the container 31, by means of which connection elements the pipetting container 30 can, in a connection position, be fixedly locked to complementary connection elements 42, 43 of a pipetting apparatus. In a preferred design of the connection device between pipetting apparatus and pipetting container, the former preferably comprises a connection flange (see FIG. 2*a*, FIG. 2*b*) and preferably comprises a latching device on the pipetting apparatus, wherein the latching device can comprise sprung clamping jaws. The container 31 comprises an end side 34, to which a number of information sections are fixedly connected. This end side lies opposite the multiplicity of sensor devices of the information reading device when the pipetting container 30 is connected to the pipetting apparatus by a connection movement along the direction B and plugged onto the pipetting apparatus.

The information reading device 44 comprises a carrier plate 45, on which a number of sensor devices 46 are arranged lying next to one another in a plane. A sensor device 46 comprises a substrate 46*a'*, on which a sensor section 46*b'* is arranged. The sensor section 46*b'* serves to carry out a measurement on an information section 35 when the latter is arranged in the connection position in the measuring space 50 and arranged lying perpendicularly opposite to the sensor section 46*b'*. The sensor devices are connected to the control device of the pipetting apparatus by means of an electric line device 46*c'*, preferably an $I^2C$ data bus.

At least several sensor sections 46*b'* are covered by a cover layer 47 and separated from the measuring space 50 by the latter. In this case the cover layer 47 is associated with the information reading device 44 and forms the common sensor area of the sensor sections 46*b'* of the sensor devices. The cover layer 47 protects the mechanically sensitive sensor sections against mechanical impairment, dirt or chemical changes by aggressive liquids or vapours, which can originate from the pipetted laboratory samples. The cover layer is preferably made of a chemically inert material, or comprises the latter, wherein the material moreover substantially does not interfere with the measurement by the sensor devices. The material selection can therefore depend on the measurement principle realized by the sensor device. Delimiting walls 48 extend perpendicular to the plane in which the sensor devices are arranged. Said walls protect the measuring space 50 against impairments in the radially inward direction in relation to the axis A, for example against radiation or dirt. This renders the measurement by the sensor devices more reliable.

In the interior volume sheathed thereby, the connection section 41 of the pipetting apparatus contains substantially all of the important components by means of which the pipetting container 30 can be connected to the pipetting apparatus in a predetermined connection position. The connection elements 42, 43 are part of a connection device, by means of which the pipetting container can be connected fixedly, but in a manner detachable by the user, to the pipetting apparatus. In this case, the delimiting walls 48 assume two additional important functions.

On the one hand, the delimiting walls 48 serve as guide device, by means of which the pipetting container 30 is guided during the connection movement B into the connection position, by virtue of complementary guide sections 39 of the pipetting container 30 gliding along the inner side of the delimiting walls. The guide device preferably serves to guide the movement in the connection direction B—along the axis A of the pipetting apparatus in the present case. This is how the connection position is reached in a precise manner. The connection position is shown in FIG. 4*b*.

On the other hand, as shown in FIG. 4*b*, the delimiting walls 48 serve as spacing device. What the spacing device achieves is that the information sections 35 of the information carrier device of the pipetting container are situated at a minimum distance D_min from the surface of the information reading device, namely the sensor area 47, in the connection position, which is also the measuring position in this case. To this end, the delimiting walls 48 serve as stop elements, against which complementary stop elements 38 on the pipetting container 30 abut, as shown in FIGS. 4*a* and 4*b*. What the spacing device achieves is that the sensor devices in the measuring position are situated at a defined distance from the information sections and, by means of the function of the guide device, are generally situated in a defined relative position in relation to the information sections. For many types of sensor devices, a distance in the region 0.000 mm<=D_min<=5.000 mm is suitable for carrying out reliable measurements and uniquely capturing the measurement states to be identified. The distance D_min should be selected in such a way that the plugging of the pipetting container onto the pipetting apparatus does not lead to a mechanical load on the sensor area 47, wherein contact with the sensor area (D_min=0.000 mm) may be permitted. The spacing device absorbs mechanical shocks and protects the sensor devices in this manner.

FIGS. 5*a*, 5*b*, 5*c*, 5*d*, 5*e*, 5*f*, 5*g*, 5*h* and 5*i* respectively show a preferred embodiment of the arrangement of sensor devices in relation to an information reading device of a pipetting apparatus according to the invention. In contrast to the illustrations in FIGS. 4*a* and 4*b*, the sensor devices are shown directed upward in this case.

Figure 5A:
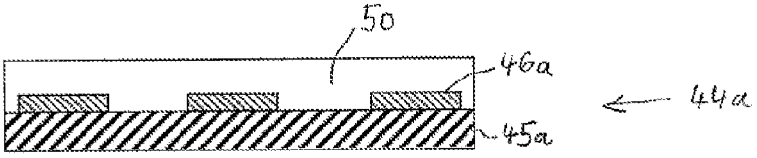

FIG. 5*a* shows the information reading device 44*a*, comprising a substrate 45*a* with sensor devices 46*a*, which are arranged parallel and next to one another in a plane, and comprising the measuring space 50, which is arranged above the sensor devices and which comprises regions which in each case lie perpendicularly opposite to the planar surface of the sensor devices 46*a*. Here, the sensor devices 46*a* are arranged on the surface of the substrate 45*a*. Here, the measuring space 50 directly adjoins the surface of the sensor sections 46*a*. Such an arrangement enables sensitive and accurate measurements. Furthermore, it is easy to inspect and service the arrangement.

Figure 5B:
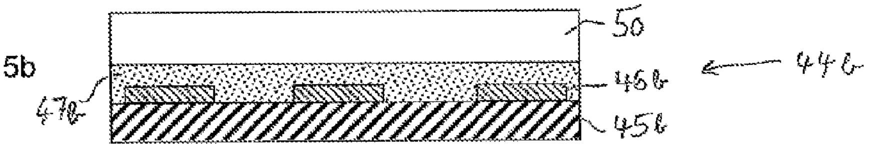

FIG. 5*b* shows the information reading device 44*b*, comprising a substrate 45*b* with sensor devices 46*b*, which are arranged parallel and next to one another in a plane, and comprising the measuring space 50, which is arranged above the sensor devices and which comprises regions which in each case lie perpendicularly opposite to the planar surface of the sensor devices 46*b*. Here, the sensor devices 46*b* are arranged on the surface of the substrate 45*b*. Provision is made for a cover layer 47*b*, which respectively contacts the surfaces of the sensor sections and protects these. The cover layer 47*b* serves as common sensor area and protects the sensor sections lying therebelow. Such an arrangement can easily be cleaned, inspected and serviced.

Figure 5C:
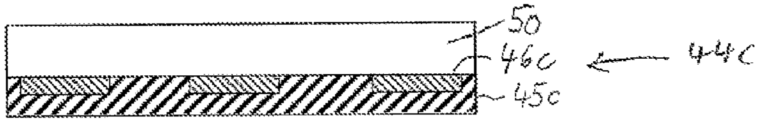

FIG. 5*c* shows the information reading device 44*c*, comprising a substrate 45*c* with sensor devices 46*c*, which are arranged parallel and next to one another in a plane, and comprising the measuring space 50, which is arranged above the sensor devices and which comprises regions which in each case lie perpendicularly opposite to the planar surface of the sensor devices 46*c*. Here, the sensor devices 46*c* are embedded into the substrate 45*c*. The surfaces of the sensor sections lie in the same plane in which the surface of the substrate lies as well. Such an arrangement can easily be cleaned, inspected and serviced.

Figure 5D:
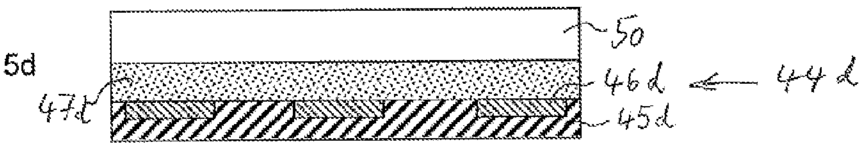

FIG. 5*d* corresponds to FIG. 5*c*. Provision is additionally made for a cover layer 47*d*, which respectively contacts the surfaces of the sensor sections and protects these. The cover layer 47*d* serves as common sensor area and protects the sensor sections lying therebelow. Such an arrangement can easily be cleaned, inspected and serviced.

Figure 5E:
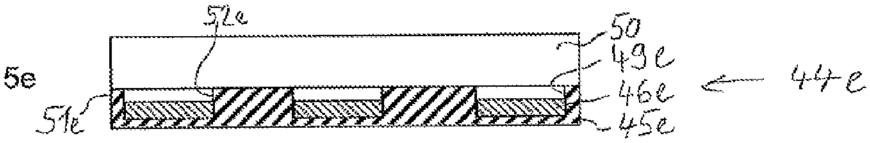

FIG. 5*e* shows the information reading device 44*e*, comprising a substrate 45*e* with sensor devices 46*e*, which are arranged parallel and next to one another in a plane, and comprising the measuring space 50, which is arranged above the sensor devices and which comprises regions which in each case lie perpendicularly opposite to the planar surface of the sensor devices 46*e*. Here, the sensor devices 46*c* are arranged sunk into the substrate 45*e*. The surfaces of the sensor sections lie below the plane in which the surface of the substrate lies. Sections 49*e*, 51*e* are arranged in the plane, laterally outside of the sensor sections, and sections 52*e* are arranged in the plane between the sensor sections. The sections 49*e*, 51*e* and 52*e* of the substrate, which extend substantially perpendicular to this plane, respectively form a delimiting wall of the portions of the measuring space 50 and protect these portions from the outside or from one another. Such an arrangement can easily be inspected and serviced and enables interference-free and accurate measurements.

Figure 5F:
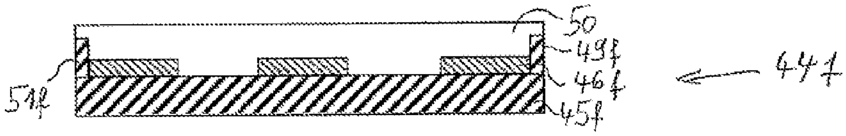

FIG. 5*f* corresponds to FIG. 5*a*, with provision being made for sections 49*f* and 51*f*, which extend substantially perpendicular to the plane of the sensor areas and are arranged laterally outside of the sensor sections and serve as delimiting walls of the measuring space 50 to the outside. Such an arrangement can easily be inspected and serviced and enables interference-free and accurate measurements.

Figure 5G:
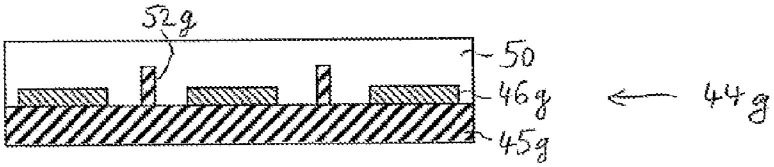

FIG. 5*g* corresponds to FIG. 5*a*, with provision being made for sections 52*g*, which extend substantially perpendicular to the plane of the sensor areas and are arranged between the sensor sections and serve as delimiting walls of the measuring space 50 toward the inside such that the different portions of the measuring space above different sensor devices do not interfere with one another. Such an arrangement can easily be inspected and serviced and enables interference-free and accurate measurements.

Figure 5H:
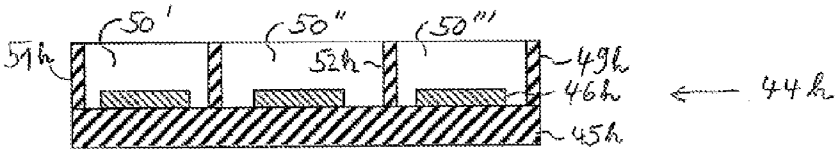

FIG. 5*h* corresponds to FIG. 5*a*, with provision being made for sections 49*h*, 51 *h* and 52*h*, which extend substantially perpendicular to the plane of the sensor areas, serve as delimiting walls of the measuring space 50 and additionally subdivide the measuring space 50 into three individual measuring spaces 50', 50" and 50'" such that the different measuring spaces above different sensor devices do not interfere with one another. Such an arrangement can easily be inspected and serviced and enables interference-free and accurate measurements.

Figure 5I:
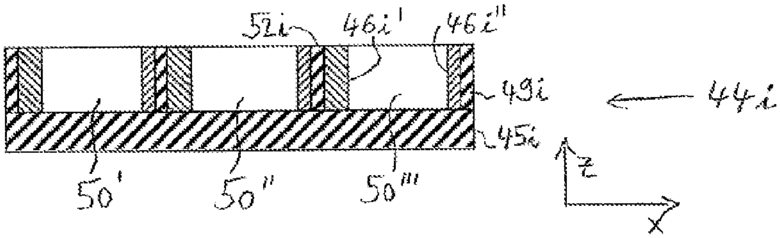

FIG. 5*i* shows the information reading device 44*i*, comprising a substrate 45*i* with sensor devices 46*i* arranged parallel to one another. A sensor device in each case comprises a first sensor section 46*i*' and a second sensor section 46*i*", which are arranged parallel to one another and lie opposite one another. Arranged between the first and second sensor section is a measuring space 50', 50" or 50'", into which an information section can engage from above. Such an arrangement of a sensor device is suitable in particular for realizing a photoelectric-barrier principle. Here, the measuring space in each case directly adjoins the surface of the first and second sensor sections, which could respectively also be protected by a cover layer or cap. Such an arrangement enables interference-free and error-reduced measurements.

Furthermore, it is easy to inspect and service the arrangement. The sensor sections can be attached to individual sensor substrates, at least in part, or can all be attached on common sensor substrates and, in particular, on sections of the substrate 45*i*.

FIGS. 6*a*, 6*b*, 6*c*, 6*d* and 6*e* respectively show a preferred embodiment of a sensor device of an information reading device of a pipetting apparatus according to the invention. In contrast to the illustrations in FIGS. 4*a* and 4*b*, the sensor devices are also shown directed upward in this case.

Figure 6A:
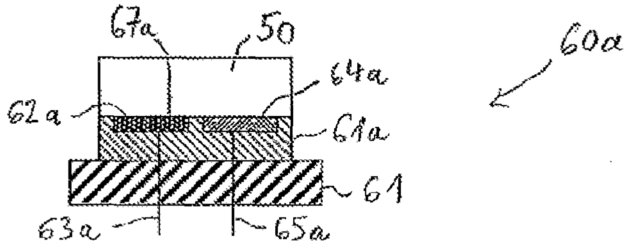

FIG. 6*a* shows the sensor device 60*a*. It is arranged on the substrate 61 of an information reading device. The sensor device comprises a sensor section 61*a*, which comprises a first sensor section 62*a*, which, in particular, is operated electrically and connected to the line 63*a*, and which furthermore comprises a second sensor section 64*a*, which, in particular, is operated electrically and connected to the line 65*a*. The first sensor section and the second sensor section lie next to one another and their sensor area lies in the same plane, which forms the common sensor area 67*a*. Situated above the sensor area 67*a* is the measuring space 50, which directly adjoins the sensor area. Such an arrangement is suitable for capacitive measurements, in which the change in the dielectric constant of the measuring space or of another capacitance value of the measuring space is detected. Such an arrangement is furthermore also suitable for e.g. reflection measurements. Here, the first sensor section forms a transmitter element and the second sensor section forms a receiver element. The emitted medium, e.g. an acoustic wave or an electromagnetic wave (preferably light), is reflected in a characteristic fashion on the information section arranged perpendicularly above the sensor area in the measurement position. This generates a characteristic measurement signal characteristic for the information or at least a fraction of the information.

Figure 6B:
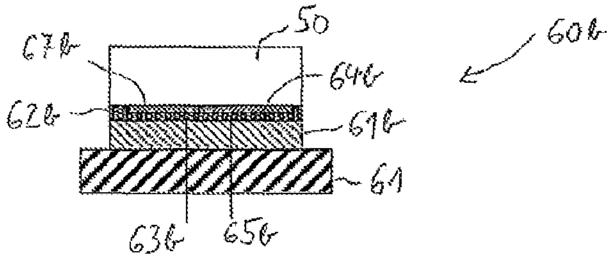

FIG. 6*b* shows the sensor device 60*b*. It is arranged on the substrate 61 of an information reading device. The sensor device comprises a sensor section 61*b*, which comprises a first sensor section 62*b*, which, in particular, is operated electrically and connected to the line 63*b*, and which furthermore comprises a second sensor section 64*b*, which, in particular, is operated electrically and connected to the line 65*b*. The first sensor section is arranged embedded in the second sensor section or arranged on the second sensor section. The first and the second sensor sections are preferably separated by a separation layer, which, in particular, is electrically insulating. The sensor areas of the first and second sensor section can lie in the same plane, which forms the common sensor area 67*b*. Situated above the sensor area 67*b* is the measuring space 50, which directly adjoins the sensor area. By way of example, such an arrangement is suitable for reflection measurements or capacitive measurements.

Figure 6C:
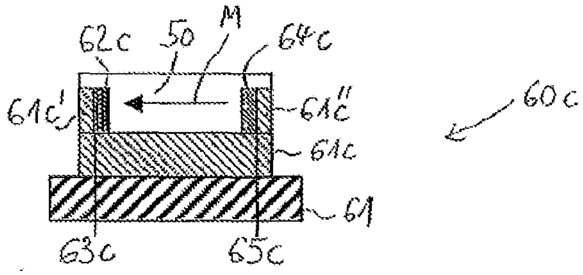

FIG. 6*c* shows the sensor device 60*c*. It is arranged on the substrate 61 of an information reading device. The sensor device comprises a sensor section 61*c*, which comprises a first sensor section 62*c*, which, in particular, is operated electrically and connected to the line 63*c*, and which furthermore comprises a second sensor section 64*c*, which, in particular, is operated electrically and connected to the line 65*c*. The first and the second sensor section are arranged parallel and opposite to one another. They are separated by the measuring space 50, which respectively adjoins the sensor area of the first and second sensor section. A first section 61*c*' of the sensor section 61*c* serves as carrier of the first sensor section and a second section 61*c*" of the sensor section 61*c* serves as carrier of the second sensor section. The arrangement is suitable in particular as a photoelectric-barrier arrangement, in particular by virtue of the first sensor section serving as transmitter element and the second sensor section serving as receiver element. In the process, a measurement beam (preferably a light beam) which passes through the measuring space 50 is used, wherein the reception is interfered with in a characteristic fashion by an information section when the latter is arranged in the measuring position in the measuring space. However, the arrangement is also suitable for capacitive measurements.

Figure 6D:
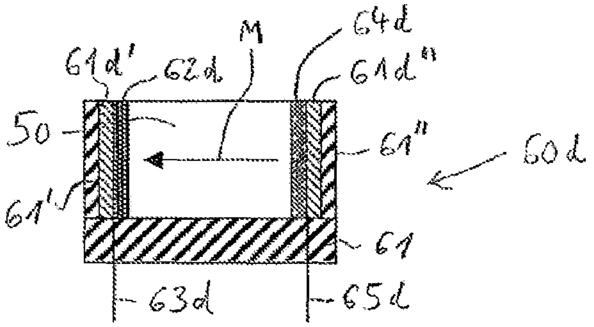

FIG. 6*d* shows the sensor device 60*d*. The latter is arranged on the substrate 61 of an information reading device. The sensor device is divided into two and comprises, separately from one another, a first sensor section 62*d*, which is carried by a first sensor substrate 61*d*' which is supported by a first section 61' of the substrate 61, and a second sensor section 64*d*, which is carried by a second sensor substrate 61*d*" which is supported by a second section 61" of the substrate 61. As in FIG. 6*c*, this arrangement can also be used as a photoelectric-barrier arrangement or for a capacitive measurement.

Figure 6E:
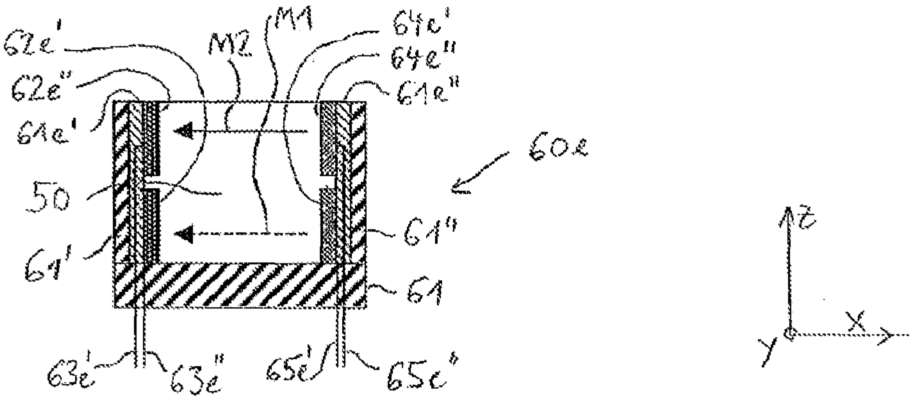

FIG. 6*e* shows the sensor device 60*e*. It has a similar design to the sensor device 60*d*. Additionally, the sensor device 60*e* is designed for measuring with a spatial resolution, by virtue of, for example, determining the engagement depth to which an information section, which is inserted into the measuring space 50 from above, engages into the latter. To this end, an individual measuring position has been installed for each position in relation to the z-axis, along which, in this case, the connection movement B more particularly also takes place, which individual measuring position is associated with at least one sensor section in each case and which, in the present case, is more particularly associated with, in pairs, a first sensor section 62*e*', 62*e*", which respectively serves as receiver element, and a second sensor section 64*e*', 64*e*", which respectively serves as transmitter element. By way of example, if an information section non-transparent to the measurement beam engages into the measuring space up to a depth of the first measuring position M1, a logical ordered pair (1, 1) can be measured. By way of example, if an information section non-transparent to the measurement beam engages into the measuring space only up to a depth of the second measuring position M2, a logical ordered pair (0, 1) can be measured. By way of example, if an information section non-transparent to the measurement beam does not engage into the measuring space at all, a logical ordered pair (0, 0) can be measured. As a result of this, the sensor device 60*e* already has a measurement resolution of M=3. A further logical ordered pair (1, 0) can easily be defined by virtue of the information section having an opening or recess at the position M2, through which the measurement beam M2 can pass through unhindered. The measurement resolution of the sensor device 60*e* then lies at M=4. In general, a number M_L of measuring positions can be provided in order to achieve a spatial resolution or a measurement resolution of up to 2^M_L (i.e. two to the power M_L). The higher the measurement resolution is in the z-direction, the fewer sensor devices have to be provided next to one another, i.e. in the lateral direction (e.g. within the x-y plane).

FIGS. 7*a*, 7*b* and 7*c* respectively show a view of a preferred embodiment of an information reading device of a pipetting apparatus according to the invention, with an annular carrier substrate and sensor devices arranged along an annulus. The concentric arrangement of a multiplicity of sensor devices or sensor sections at a constant distance enables the user to plug the pipetting container onto the pipetting apparatus at any rotational angle position around the direction of the connection movement B; this applies in particular in combination with a guide device and, in particular, in the case of a suitable selection of encoding the information on the information carrier device. The use of the pipetting apparatus becomes more convenient thereby.

In FIGS. 7*a*, 7*b* and 8*a*, respectively 7 positions are arranged on the circular circumference of the information reading device. There are, for example, two logical measurement states per position: “sensor receives” “yes” or “no”. Since the rotational position of the pipetting container is arbitrary during insertion, the number of encoding options is restricted. Encoding options in which all contacts are actuated or not actuated also have to be dispensed with since there is no reference level using this. Hence, this results in a total of 11 encoding options when using the 7 sensor devices, i.e. 11 different types of pipetting container can be identified.

FIG. 7*a* shows the information reading device 70*a*. It has an annular substrate 71*a*, in which a circular hole 74*a* is provided, which, in the case of a pipetting apparatus embodied as a dispenser, can serve for retreating the plunger of a pipetting container when the latter is arranged on the pipetting apparatus in the connection position. From the outer edge of the substrate 71*a*, a lateral delimiting wall 72*a* can extend upward and shield the measuring space above the sensor devices 73*a*. Adjacent sensor devices are arranged, respectively at the same constant distance, along an imagined circular path around the centre of the substrate 71. The sensor devices 73*a* respectively have a sensor area which lies parallel to the x-y plane and perpendicular to the z-axis or to the direction B of the connection movement.

FIG. 7*b* shows the information reading device 70*b*, which is similar to that in FIG. 7*a*, wherein, in particular, the substrates 71*a*, 71*b* including the respective circular holes 74*a*, 74*b* are similar parts, and the lateral delimiting walls 72*a*, 72*b* are similar parts. However, the sensor devices 73*b* differ from the sensor devices 73*a*. The sensor devices 73*b* respectively have a sensor area which lies perpendicular to the x-y plane and parallel to the z-axis or to the direction B of the connection movement. A sensor device 73*b* has a similar design to the sensor device 60*c*, 60*d* or 60*e*, (see FIG. 6*c*, 6*d* or 6*e*) and has, in pairs, opposing sensor sections 73*b*' and 73*b*". In particular, it can have a vertical spatial resolution M1, M2 (or M_L) and/or a horizontal spatial resolution M1, M2 (or M_L') such that this can result in an overall measurement resolution of (M_L*M_L'). Here, it is possible, in particular, to use a lower number of transmitter elements than receiver elements.

FIG. 7*c* shows the information reading device 70*c*, which is similar to the one in FIG. 7*a*, wherein in particular, the substrates 71*a*, 71*c* including the respective circular hole 74*a*, 74*c* are similar parts and the lateral delimiting walls 72*a*, 72*c* are similar parts. The even number of first sensor sections 73*c*", which are embodied as transmitter elements, and the even number of sensor sections 73*c*', which are embodied as receiver elements, respectively have a sensor area which lies perpendicular to the x-y plane and parallel to the z-axis or to the direction B of the connection movement. The measuring radiation (preferably light) from a transmitter element is in each case aligned in such a way that it can impinge on each of the two adjacent receiver elements. Transmitter elements and receiver elements are arranged respectively alternately next to one another in the circumferential direction of the circle; a measuring space 50', 50", in which an information section can engage in the measuring position, is respectively situated be-tween a transmitter element and a receiver element. Adjacent pairs of transmitter element 76*c* (first sensor section) and receiver element 73*c*' (second sensor section), as well as transmitter element 75*c* (first sensor section) and receiver element 73*c*' (second sensor section), respectively, form one sensor device. The sensor devices respectively adjacent on the circumference can, for example, be operated successively in time in order to use a common receiver element 73*c*' in each case. Alternatively, measurements can, at least in part, be taken simultaneously and the transmitter elements can use measurement radiation modulated e.g. by different modulation frequencies, which, after interaction with an information section, are evaluated per lock-in method by an evaluation device, depending on the modulation frequency, in order to obtain information characteristic to an information section. Provision can also be made for spatial resolution (M1, M2) or (M3, M4). These provisions can reduce the number of sensor sections 73*c*', 73*c*" required for a desired measurement resolution.

FIG. 8*a* shows an arrangement of sensor devices, in which optical sensor devices are arranged in accordance with the first preferred embodiment of the pipetting apparatus according to the invention.

In accordance with FIG. 8*b*, it is proposed that, as a sensor device 80, the sensor element has a light source 81, which emits in the direction of the information carrier device 90. Different geometries, which reflect the light with a different degree of reflection, are arranged on the pipetting container at the light impingement areas of the information section. Light-detecting receiver elements 82, onto which the light is reflected back to a different extent, are arranged, directly or indirectly next to the transmitter element 81, on the sensor device. The received light is converted into an electric current and associated with the respective measurement positions by evaluation electronics.

The individual light sources are actuated, clocked successively in time, and the detectors are queried. As a result of the temporal assignment, the degree of reflection of the individual positions can be queried in succession and be associated with specific decision levels. Since the cycle times are only a few ms, the coding can be queried in a fraction of a second in a microprocessor-controlled fashion.

In a preferred embodiment, it is proposed to use vertically emitting lasers, so-called VCSELs, as light sources. During the production of vertically emitting lasers, semiconductor coating processes similar to those of LEDs are employed, in which the laser resonator is constructed in a cost-effective manner on a wafer by several coating processes above one another and structured by mask processes in such a way that the laser light is emitted vertically with respect to the plane of the substrate. As a result of the laser-specific properties, the coherent light—preferably with a wavelength of 850 nm—is emitted with a small emission angle of approximately an aperture angle of 10 to 15° with respect to the normal, and so no additional focusing optical system is required. Vertically emitting lasers (VCSELs) furthermore have a low threshold and a high quantum yield, and so evaluable beam powers are already emitted at low currents of a few pA. As a result, the battery operation of the mobile pipetting apparatus becomes possible. Alternatively, it is also possible to use LEDs as a radiation source.

PIN photodiodes lend themselves as receiver element or light detector. In order to capture the greatest possible proportion of the reflected light, it is proposed to arrange the photodiodes as closely as possible next to the VCSEL chip directly on the same carrier. In another exemplary embodiment, it is also feasible to assemble and contact the VCSEL directly on a photodiode (analogously to the arrangement in FIG. 6*b*). The use of components in which transmitter and receiver (VCSEL and photodiode) are integrated on a chip (analogously to the arrangement in FIGS. 6*a*, 6*b*, 6*c*) is also feasible.

The encoding geometries on the edge of the pipette are preferably designed in such a way that they pass or reflect light with different degrees of reflection or different degrees of transmission. It is important for the evaluation that the light levels received by the detector can be associated with defined classes. Resulting from the posed object that one of the positions of the pipettes should be characterized as a reference position, the preferred embodiment of being able to detect 3 clearly differentiable levels (measurement resolution M=3) is furthermore proposed. Since the pipettes can be manufactured from different materials, which have different optical transparency to the laser light, different geometries are proposed, which, in particular, can be used for different materials.

FIGS. 8*a* and 8*b* show the functional principle of such an information reading device with such sensor devices:

A printed circuit board 83, which is designed as circular blank, serves as base plate. On this printed circuit board, the transmitter components as transmitter chip 81 are positioned in cavities 84 at 7 positions (P_a . . . P_g) on a circle with uniformly divided angular sectors. Respectively one receiver chip 82 is positioned directly next to the transmitter chip. The chips are respectively contacted by bonding wires 85*a* and 85*b*, which connect the electric contacts on the chip to conductor tracks 86 on the printed circuit board. The cavities are encapsulated using an optically transparent material 87 (preferably a polymer) and thus, as a cast cover layer, protect the components. The printed circuit board comprises all further components required for the electrical function (not illustrated in the schematic diagram).

The pipetting container is placed onto the information reading device at a minimum distance D_min; component 90 represents a section of the edge (also referred to as lower edge), serving as information carrier device, of an end face of the pipetting container. An encoding step 92, which is realized by a specific encoding geometry (or a number M of distinguishable encoding geometries) and serves as information section, is situated in the edge of the end face of the pipetting container.

The VCSEL 81 emits a light beam with a specific aperture angle. The light impinges on the surface of the pipette in the encoding step and is reflected. Here, at least some of the light reaches the receiver chip and is converted into an electric pulse (photoelectric current) therein. The reflected component is distinguished by virtue of e.g. how this encoding geometry is designed, in particular what angle it has, in particular according to the type of material and in particular according to the surface roughness.

In respect of the preferred embodiment with optical sensor devices, which, in particular, are designed for reflection measurement, a further aspect of the invention consists of finding suitable encoding geometries, in which the effectiveness of the optical coupling between the transmitter element, more particularly the laser, and the receiver element, more particularly the photodiode, generates levels which are as defined as possible. It is preferable for 3 measurement states, which can be clearly distinguished from one another, to be enabled, namely represented by minimum/maximum coupling and a level situated therebetween (medium). A further preferred aspect consists of not introducing any additional manufacturing processes. The pipetting containers should be produced with the same manufacturing methods as have been practised up until now. Further outlay as a result of applying, adhering or printing the information carrying device onto the pipetting container should preferably be avoided. However, such steps are possible and are preferably also provided for in an alternative.

FIGS. 9*a* and 9*b* show classifications of the encoding geometries according to the invention:

The pipettes and the adapters introduced into the shaft are made from different materials; these are materials transparent to light (FIG. 9*b*) and materials non-transparent to light (FIG. 9*a*). Geometries are proposed for all of these materials, in which respectively a maximum optical coupling, a minimum optical coupling and preferably coupling effectiveness situated therebetween can be realized.

Partial FIGS. 1A to 4B respectively show a section of the sensor with laser and photoreceiver chip positioned next to one another on the main printed circuit board, encapsulated by an optically transparent material. The edge of a pipette with different geometries is positioned on the upper side.

What applies to non-transparent materials—variants 1A to 4A in FIG. 9*a*—is that the light can only be reflected at the lower edge of the pipetting container which faces the information reading device. In the geometry 1A, the light impinges on a pipette flank 20', which is inclined at such an angle that as much of the emitted light as possible impinges on the photodiode from the VCSEL. In the variant 2A, in which as little light as possible should be coupled onto the detector, the flank is inclined in such a way that the light is preferably reflected away completely. In the variant 3A, the pipetting container has a hole such that it is likewise not possible for light to reach the receiver.

In the variant 4A, the lower edge of the pipetting container has a recessed flank such that the light can only be partly reflected back onto the detector. FIGS. 9*a* and *b* in each case also specify the coupling effectiveness (in %), which was calculated by simulation and confirmed by practical trials.

In the case of transparent materials, the assumption can be made that the light enters the material almost completely through the underside of the pipetting container. In the case 2A—parallel transparent wall—and 3B—hole in the pipette—only minimal light portions are reflected back in each case. In a further aspect of this preferred embodiment, a prismatic pyramid is formed on the outside as prism element in the case of transparent materials—see image 1B. If the light that entered into the pipette impinges on the inclined flank, the angle of emergence from the denser into the less dense medium (air) is greater than the angle of incidence and there is total internal reflection of most of the light. The light is once again reflected at the opposite flank and arrives back at the receiver. It was shown that up to 14 percent of the light is reflected back to the receiver in this manner.

Since the laser light is not only emitted perpendicularly but partially also with other angles—the so-called aperture angle—the emission angle of some of the light is also smaller than the angle of total internal reflection. This effect is employed to generate the “medium” level (see 4B). In this case, the formed-on prism is inclined precisely in such a way that as far as possible precisely half of the light from variant 1A is reflected back. Calculations result in a flank angle of approximately 37° for the flank 22'.

FIG. 10*a* shows an exemplary embodiment of the information reading device, FIG. 10*b* shows the equipped carrier printed circuit board of the information reading device, FIG.

10*c* shows the complete information reading device with a cover cap which is advantageous because it is protective.

In a further aspect of the invention, the geometry of the main circuit board 131 is designed in such a way that it fits into a manual pipetting apparatus, more particularly into the housing of a conventional pipetting apparatus and comprises guide holes 132 to this end. Respectively 7 VCSEL (vertical cavity surface emitting laser) chips (134*a* to *g*) and, respectively at the same distance next to each one, a photodiode chip (135*a* to *g*) are situated on regular circle segments on a surrounding circle 133 with a defined central radius. The printed circuit board furthermore has conductor tracks for the electric connections and bond wires for contacting the chips (not illustrated in the drawing). These also establish the electric connection to the other components on the printed circuit board, which serve for signal processing. These are the microprocessor 136, a magnetic switch 137 and a plug-in socket 138, which establishes the electrical connection to the instrument and the power supply.

FIG. 10*d* shows the information reading device in a closed state. A cover cap 139 is situated on the equipped sensor printed circuit board. The cap consists of a material that is transmissive for the wavelength of the lasers. It can optionally be designed in such a way that it simultaneously is non-transmissive for the wavelength of the surrounding light. The cap can also have a filter on its upper side, which is only transmissive for the transmitter wavelength.

The space between cap and printed circuit board is completely encapsulated by a polymer 310 transparent to the transmitter wavelength, the refractive index of which polymer is matched, more particularly adapted or equalized, to the one of the cap. Here, it is advantageous if, in particular, the beam path between the photodiode and transmitter is completely filled so that the light cannot be additionally scattered at the transition to a less-dense material (for example a cavity).

On its upper edge, the cap has contours 311 with ramp elements, which correspond to structures, more particularly at least one spacing element or stop element, formed onto the pipetting container in such a way that, when the pipette is rotated, the surface of the pipetting container is pressed away from the sensor area and distanced such that scratching of the sensor surface is prevented thereby. The ramp elements are part of the spacing device.

FIGS. 10*e* and 10*f* show the information reading device with a pipetting container 140 plugged thereon. In the figures, the pipetting container is separated in the middle of the shaft and only that part is illustrated which lies on a spacing device of the information reading device. On its lower shaft, the pipetting container has a formed-on prism 141 at seven locations. The cover and the cast are not illustrated in the figures. It is possible to identify the printed circuit board and the transmitter and receiver, assembled thereon, as a chip, the VCSEL 134 and the photodiode 135. The light from the VCSEL—illustrated by the arrows—radiates through the cast polymer, the cover and reaches into the lower edge of the pipetting container. The light is reflected (total internal reflection) on the inclined wall of the formed-on prism, reaches the second prism flank, is reflected there again and returns to the photodiode, which is arranged next to the VCSEL, through the cap and the polymer.

In a clocked manner, the sensor queries all 7 information sections in succession by virtue of respectively actuating the VCSELs separately. Here each VCSEL has a separate actuation line. The photodiodes can be queried at the same time and be connected in series. Since it is known what VCSEL is actuated at what time, it becomes possible to infer from which photodiode the received photoelectric current originates. The received photoelectric current can only originate from the associated, adjacent photodiode.

In order to determine two signal levels of two measurement states that are to be distinguished from one another, which signal levels, for reflection purposes, originate from two different symmetries on the information sections, a dynamic threshold is calculated and introduced for the received electric currents from the photodiodes. In this exemplary embodiment, provision is made for significant and characteristic levels of the measurement signal to be identified for three measurement states and for the information to be able to be derived therefrom.

In specific applications, it may be necessary to eliminate interfering surrounding light when evaluating the levels. To this end, it is proposed to modulate the VCSELs during operation with a specific frequency. The receivers—photodiodes—then respectively receive the DC light on which the frequency has been superposed. The received light is amplified and demodulated. The receiver can then eliminate the DC light component and evaluate the intensity of the modulated signal.

The advantages of the optical sensor in accordance with the first embodiment lie in that there is no wear of the sensor device. There are no mechanically moving parts in the information reading device which could fail. The service life of the optical components is sufficiently high. The sensor only still has a planar area, which can easily be cleaned. The solution can be extended in such a way that a third measurement state or further measurement states are introduced. Hence this increases the number of encoding options. The solution in accordance with the first preferred embodiment only has low spatial requirements since the optical components only have relatively small dimensions.

FIG. 11*a* shows an arrangement of sensor devices, in which capacitive sensor devices are arranged in accordance with the second preferred embodiment of the pipetting apparatus according to the invention.

Figure 11B:
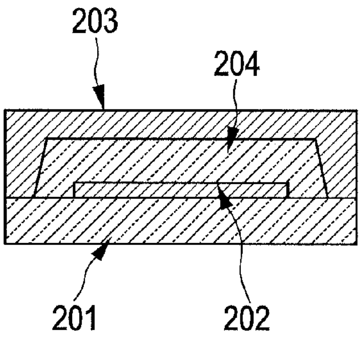

FIG. 11*b* shows a cross section of the design of a capacitive sensor device, which can be used for the second preferred embodiment of the pipetting apparatus according to the invention.

The use of one or more capacitive sensor devices 201 enables a reliable detection of the various information sections while having improved durability compared to a mechanical solution.

Capacitive sensor devices are contactless switches. In particular, the capacitive sensor devices are based on the principle of the capacitive proximity switches. The primary sensors serving as sensor devices in this case are capacitors integrated into the substrate of the information reading device. The capacitance value of such a primary sensor changes if objects approach its surface, e.g. the information section 203 with the possible cavity 204, the dielectric constant £ r of which is greater than that of air (∈r~1). This change is evaluated by electronics, which in this case are integrated directly on the printed circuit board of the information reading device. The primary sensors are preferably, where possible, blind in the outer region of the sensor ring 201 (where the attachment grooves are) so that guide ribs next to a recess are not erroneously detected and, as a result, the recess is not identified as such. The primary sensors likewise have to have little sensitivity towards the inside, in particular so as not to detect the passing plunger of a dispenser tip. This therefore results in the sensitivity region for the primary sensors denoted by 202 in FIG. 11*b*.

For the preferred design of the primary sensors, it is proposed to find a compromise between two preferred but partially contradictory aspects. On the one hand, it is preferred for the sensors to be as small as possible in order to avoid erroneous detections: laterally due to guide ribs or axially as a result of a badly centred cylinder shaft, possibly with flatter, wave-shaped recesses. On the other hand, the area of the primary sensor should be as large as possible in order to enable a large change in the capacitance value and hence a good signal-to-noise ratio, even if the information carrier devices are not arranged everywhere with the same distance D (preferably D=D_min) over the ring 201. Three layout variants are under discussion for the primary sensors. These are illustrated in FIGS. 12*a*-12*c*.

FIGS. 12*a*, 12*b* and 12*c* respectively show a lateral cross section and a view of a preferred embodiment of the electrode arrangement of a capacitive sensor device, which can be used for the second preferred embodiment of the pipetting apparatus according to the invention.

In laboratory trials, a capacitance value of approximately 1 pF was measured in the case of a planar, annular capacitance in accordance with the type from FIG. 12*b*. In the case of a finger layout as per the type in FIG. 12*a*, a capacitance of approximately 5 pF was measured. An information carrier device placed over the sensor area in both cases changed the value by approximately 100 fF. The variant of the electrode arrangement in FIG. 12*a* is particularly preferred. It was found to be the most suitable variant in respect of the measurement sensitivity. The field lines are relatively sharply delimited by the finger structure. The lateral extent of the field and its spatial depth are correspondingly low. However, as a result of the finger arrangement, a large active surface is also obtained, which promises the best possible detection.

The invention claimed is:

1. A pipetting apparatus (1; 20) for pipetting laboratory samples into a pipetting container (2; 2'; 140) which can be connected to the pipetting apparatus, which pipetting container comprises a container side (11; 11'; 34) and a first connection section (12; 12'; 32, 33), by means of which the pipetting container can be connected to the pipetting apparatus, and which pipetting container comprises, on the container side, an information carrying device with at least one information section (14; 14'; 35; 92; 141), which carries information, the pipetting apparatus having a connection device (42, 43), by means of which, in a connection position, the first connection section of the pipetting container can be connected to the pipetting apparatus, and an electric information reading device (44; 44*a-i*; 70*a-c*), by means of which the information can be read in the connection position, wherein the information reading device comprises at least one electric sensor device (46; 46*a-h*; 46*i*', 46*i*''; 60*a-e*; 73*a-b*) which comprises at least one sensor section (46*b*'; 46*a-h*; 46*i*', 46*i*''; 61*a-d*; 61*d*', 61*d*''; 61*e*', 61*e*''; 73*b*', 73*b*''; 73*c*', 73*c*'') having a sensor area (47; 67*a*; 67*b*), which is substantially planar, and, opposite to the at least one sensor section and adjoining the sensor area, at least one measuring space (50; 50', 50'', 50'''), which is a clear space, in which the at least one information section of the pipetting container, in the connection position is arranged without the transmission of mechanical forces from the pipetting container to the sensor device, wherein the sensor device is configured to carry out a measurement which is influenced by the at least one information section in the at least one measuring space, by means of which this information can be established.

2. The pipetting apparatus according to claim 1, wherein the pipetting apparatus has a spacing device (38, 48), which, in the connection position, spaces the information carrying device at a predetermined distance of at least D=D_min from the sensor device, where 0.000 mm<=D_min<5.000 mm.

3. The pipetting apparatus according to claim 1, wherein the information reading device comprises a number N>1 of sensor devices, the sensor sections of which have a common sensor area adjoining the at least one measuring space, which sensor area has a substantially planar design.

4. The pipetting apparatus according to claim 1, wherein a cover device is arranged above the sensor area.

5. The pipetting apparatus according to claim 1, which comprises an electric control device, which is connected to the information reading device, which has a number N>1 of sensor devices, wherein the control device is configured to read out the information according to a readout method by means of the information reading device, which readout method provides for querying the sensor device sequentially in time.

6. The pipetting apparatus according to claim 1, wherein the at least one sensor device is configured to measure three distinguishable measured values, wherein a measured value can be uniquely assigned to a measurement state M of an information section.

7. The pipetting apparatus according to claim 1, wherein the at least one sensor device is configured to measure a capacitance, in particular the capacitance in the measuring space.

8. The pipetting apparatus according to claim 1, wherein the at least one sensor device is configured to measure an optical property of the information section, in particular an optical signal reflected by an information section.

9. A pipetting container (2; 2'; 140)

which comprises a container side (11; 11'; 34) and a first connection section (12; 12'; 32, 33), by means of which the pipetting container can be connected to a pipetting apparatus, and an information carrier device arranged on the container side, which information carrier device has at least one information section (14; 14'; 35; 92; 141), wherein the pipetting container (2; 2'; 140) is configured for being connected with a pipetting apparatus (1; 20) in a connection position, the pipetting apparatus having a connection device (42, 43), by means of which, in a connection position, the first connection section of the pipetting container can be connected to the pipetting apparatus, and an electric information reading device (44; 44*a-i*; 70*a-c*), by means of which the information can be read in the connection position, wherein the information reading device comprises at least one electric sensor device (46; 46*a-h*; 46*i*', 46*i*''; 60*a-e*; 73*a-b*) which comprises at least one sensor section (46*b*'; 46*a-h*; 46*i*', 46*i*''; 61*a-d*; 61*d*', 61*d*''; 61*e*', 61*e*''; 73*b*', 73*b*''; 73*c*', 73*c*'') having a sensor area (47; 67*a*; 67*b*), which is substantially planar, and, opposite to the at least one sensor section and adjoining the sensor area, at least one measuring space (50; 50', 50'', 50'''), which is a clear space, in which the at least one information section of the pipetting container, in the connection position, is arranged without the transmission of mechanical forces from the pipetting container to the sensor device, wherein the sensor device is configured to carry out a measurement which is influenced by the at least one information section in the at least one measuring space, by means of which this information can be established.

10. The pipetting container according to claim 9, wherein the at least one information section is configured for a predetermined reflection, in particular for an at least partial or substantially complete total internal reflection, of a predetermined optical signal.

11. The pipetting container according to claim 10, wherein the at least one information section is configured for a predetermined change in the capacitance of the measuring space of the pipetting apparatus, in which the information section is arranged.

12. A method for producing the pipetting container according to claim 9, the method comprising:

providing a polymer; and using the polymer to produce a pipetting container according to claim 9 by a polymer casting process.

* * * * *